US011176175B1

(12) United States Patent
Snyder et al.

(10) Patent No.: US 11,176,175 B1
(45) Date of Patent: Nov. 16, 2021

(54) SYSTEM AND METHOD FOR COMPUTING AND MANAGING DATASETS USING HIERARCHICAL ANALYTICS

(71) Applicant: 21CT, Inc., Austin, TX (US)

(72) Inventors: James Snyder, Cedar Park, TX (US); Stuart Jarriel, Austin, TX (US); Joseph Raphael Dente, Austin, TX (US)

(73) Assignee: Pulselight Holdings, Inc., Austin, TX (US)

( * ) Notice: Subject to any disclaimer, the term of this patent is extended or adjusted under 35 U.S.C. 154(b) by 819 days.

(21) Appl. No.: 14/815,894

(22) Filed: Jul. 31, 2015

Related U.S. Application Data

(60) Provisional application No. 62/031,848, filed on Jul. 31, 2014.

(51) Int. Cl.
*G06F 16/28* (2019.01)
*G06F 16/25* (2019.01)

(52) U.S. Cl.
CPC .......... *G06F 16/283* (2019.01); *G06F 16/254* (2019.01)

(58) Field of Classification Search
CPC .............................. G06F 16/283; G06F 16/254
USPC .......................................................... 707/602
See application file for complete search history.

(56) References Cited

U.S. PATENT DOCUMENTS

| | | | | |
|---|---|---|---|---|
| 6,173,310 B1 * | 1/2001 | Yost | ................... | G06F 17/30867 707/E17.109 |
| 7,089,266 B2 * | 8/2006 | Stolte | ................ | G06F 17/30592 707/769 |
| 7,464,383 B1 * | 12/2008 | Dow | ..................... | G06F 9/4488 719/316 |
| 8,738,414 B1 * | 5/2014 | Nagar | .................. | G06Q 10/101 705/7.25 |
| 8,812,752 B1 * | 8/2014 | Shih | ..................... | G06Q 10/063 710/29 |
| 9,229,952 B1 * | 1/2016 | Meacham | ........... | G06F 16/2386 |
| 9,465,653 B2 * | 10/2016 | Kishore | ................ | G06F 9/4843 |
| 10,157,347 B1 * | 12/2018 | Kasturi | .................. | G06N 20/00 |
| 2007/0094060 A1 * | 4/2007 | Apps | ................... | G06F 16/2465 705/7.36 |
| 2007/0219990 A1 * | 9/2007 | Crivat | .................... | G06F 16/283 |
| 2008/0319878 A1 * | 12/2008 | Glebe | .................. | G06Q 10/087 705/28 |
| 2010/0250487 A1 * | 9/2010 | Gabriel | .................. | G06Q 10/06 707/608 |
| 2010/0325564 A1 * | 12/2010 | Mital | .................... | G06T 11/206 715/757 |
| 2013/0006987 A1 * | 1/2013 | Stevenne | ............ | G06F 11/3072 707/737 |

(Continued)

*Primary Examiner* — Mohsen Almani
(74) *Attorney, Agent, or Firm* — J. Roger Williams, Jr.

(57) ABSTRACT

Disclosed are a method and system for propagating data changes in a hierarchy of dataset models in which each dataset model comprises an analytic and one or more parent datasets, including a primordial dataset. The analytic is executed to instantiate a first instance of the data model. After a change in a primordial dataset, each instance of a dataset model that descends from the primordial dataset is invalidated, and the analytic is re-executed to create a second instance of the data model. Analytical results may be displayed. The first dataset model may include a metric in which the definition of the metric comprises metadata of the dataset model. Metric values may be stored in a first cache, re-computed on a new instance of the dataset model, and stored in a second cache.

35 Claims, 23 Drawing Sheets

(56) References Cited

U.S. PATENT DOCUMENTS

| | | | | |
|---|---|---|---|---|
| 2014/0344817 A1* | 11/2014 | Jovanovic | ............. | G06F 9/5066 |
| | | | | 718/102 |
| 2015/0186825 A1* | 7/2015 | Balasubramhanya | ....................... | |
| | | | | G06Q 10/06315 |
| | | | | 705/7.25 |
| 2017/0235848 A1* | 8/2017 | Van Dusen | ............. | G06F 30/20 |
| | | | | 705/12 |

* cited by examiner

FIG. 2 torch — Search...  Add to Graph

Provider

JAMES SABOURIN
OCCUPATIONAL THERAPIST TPI: 9008121
Programs: MEDICAID

— 210

215 — Connected to
3
Providers with Case History

220 — Sep 12, 2008 Earliest Paid Claim
Sep 4, 2009 Most Recent Paid Claim 225 — Recent Profile Activity
LOW
5 Page Views 230 — Top 5 Procedures by Amount
97112  $15,277.86
97530  $11,474.17
97110  $1,023.32
97004  $560.00
97003  $140.00

240 — Top 5 Diagnoses by Count
7421   102
85400  38
3481   37
3432   36
7813   35

280 — 0 Cases

250 — $28,475 Claims Paid

245 — Medicaid Claims Paid History
$15k / $10k / $5k — Sep 2008, Jan 2009, May 2009, Sep 2009

260 — Associated Locations

A  CHI CHI PANCAKE HOUSE
1517 I35N
SAN MARCOS, TX 78667
48 associated providers 270 — Map (Oklahoma, Dallas, Texas, Albuquerque, New Mexico) Map | Satellite

SEND FEEDBACK

— 200 torch

▽ Search...

Providers with Cases Connected to JAMES SABOURIN (TPI: 9008121)

DataSet  Created on Jul 28, 2014

— 300

3 Connected providers

3 Cases

0 Open cases

$245 Estimated recovery

⤓ Export

3 Items  ⊕ Add Items to Graph

| ☐ | Provider Name | Provider Type | TPI | Open Cases | Closed Cases | Total Cases | Estimate Recovery |
|---|---|---|---|---|---|---|---|
| ☐ | DREAMA GUYS | PHYSICAL THERAPIST | 9155817 | 0 | 1 | 1 | $0.00 |
| ☐ | TAMAR VANHEE | PHYSICAL THERAPIST | 9701011 | 0 | 1 | 1 | $245.00 |
| ☐ | VITA YGLESIAS | PHYSICAL THERAPIST | 9150900 | 0 | 1 | 1 | $0.00 |

SEND FEEDBACK

FIG. 3 torch

Profiles | Graph

Provider

TAMAR VANHEE
PHYSICAL THERAPIST TPI: 9701011
Programs: MEDICAID, CHRONICALLY ILL AND DISABLED CHILDREN Connected to
8
Providers with Case History

1
Cases

Jan 18, 2008
Earliest Paid Claim

Apr 11, 2014
Most Recent Paid Claim

Recent Profile Activity
LOW
0 Page Views

$236,313
Claims Paid

Medicaid Claims Paid History
$10k
$7.5k
$5k
$2.5k
2008  2010  2012  2014

| Top 5 Procedures by Amount | |
|---|---|
| 97116 | $80,595.12 |
| 97530 | $75,728.49 |
| 97110 | $60,276.00 |
| 97001 | $16,250.84 |
| 97002 | $2,194.02 |

| Top 5 Diagnoses by Count | |
|---|---|
| 7813 | 1497 |
| 34830 | 1025 |
| 3432 | 973 |
| 3430 | 597 |
| 6039 | 436 |

Search...

Add to Graph

SEND FEEDBACK

Associated Locations

SOUTHERN STATES COOPERATIVE INC.
HART
A 1521 RAILROAD AVE

Albuquerque
New Mexico | Texas | Oklahoma | Arkansas
Map | Satellite

Find providers by procedure codes billed

Created on Jul 28, 2014

Filters:

| Procedure Code | Country | Date Range |
|---|---|---|
| 00100 | All | From 1/2/2008 To 3/21/2014 |

DataSet

- ⊙ 139 Suffixes
- $143.96k Claims paid
- 711 Claim headers
- $202 Average per claim
- ⊙ 548 Distinct recipients
- $262 Average per recipient 139 Items / 3 selected    ⟡ Add Items to Graph — 810

| | Provider Name | ⊙ | TPI | Suffix | Provider Type | Specialty | County | Claims Paid ▼ | Claims Headers | Distinct Recipients |
|---|---|---|---|---|---|---|---|---|---|---|
| ☑ | Invito Terra Lim... | 7 | 9100100 | 02 | PHYSICIAN GR... | MULTISPECIAL... | SAN PATRICIO | $14,312.98 | 56 | 40 |
| ☑ | Detineo Bonae... | 4 | 9158581 | 02 | PHYSICIAN GR... | MULTISPECIAL... | LUBBOCK | $8,480.80 | 45 | 37 |
| ☑ | Congrego Arg... | 0 | 8080250 | 01 | PHYSICIAN GR... | MULTISPECIAL... | BROWN | $7,156.57 | 37 | 21 |
| ☐ | Decessio Tumb... | 1 | 9511112 | 02 | PHYSICIAN GR... | MULTISPECIAL... | LEE | $4,752.98 | 20 | 20 |
| ☐ | Furcilio Villicus | 0 | 0019101 | 01 | CERTIFIED REG... | CERTIFIED REG... | WISE | $4,526.32 | 32 | 31 |
| ☐ | Uterlibet Aspe... | 1 | 0020701 | 01 | PHYSICIAN GR... | ANESTHESIOL... | COLORADO | $4,405.10 | 25 | 22 |
| ☐ | Onustus Subve... | 0 | 0150501 | 01 | PHYSICIAN GR... | ANESTHESIOL... | TOM GREEN | $3,998.40 | 16 | 14 |
| ☐ | Praescio Cadav... | 2 | 0110009 | 01 | PHYSICIAN GR... | MULTISPECIAL... | WHARTON | $3,973.07 | 12 | 12 |
| ☐ | Gravi Ascisco... | 0 | 0019099 | 01 | CERTIFIED REG... | CERTIFIED REG... | UVALDE | $3,568.32 | 22 | 21 |

FIG. 8

```
{                                           ← 1600
1610 → name: "provider_payment",
1615 → dataset: "DST_ClaimHeader",
1620 → targetType: "provider",
1625 → targetIdField: "provider_id",
1630 → valueField: "total_paid",
1635 → valueType: "number",
1640 → defaultValueAggregate: "sum",
1645 → distinct: true,
1650 → coalesce: true,
1655 → filter: [
          {
            fieldName: "statuscode",
            value: "P",
            comparator: EQ
          }
        ],
1660 → dimensions: [
          {
1670 →      dimensionField: "paiddate",
            dimensionType: "time",
            timeGranularity: "month"
          },
          {
1680 →      dimensionField: "claim_type",
            dimensionType: "category"
          },
          {
1690 →      dimensionField: "suffix",
            dimensionType: "category"
          }
        ]
      }
```

FIG. 16

1710 — Number getMetric(id, key)

1720 — Number getMetric(id, key, aggregate)

1730 — Number getMetric(id, key, aggregate, filter[])

1740 — Number getMetric(id, key, aggregate, filter[], timerange)

1750 — Series<Number> getMetricSeries(id, key, aggregate, pivot[], filter[], timerange, topN)

1760 — String getMetricDimensionValue(key, aggregate, dimension)

1770 — List<String> getMetricDimensionValues(key, dimension)

1780 — Map<String,String> getMetricDimensionSelectionValues(key, dimension)

1700

FIG. 17 select {fields} from {datasetInstanceTable} where {metricWhereClause} [AND {filterWhereClause}] {groupByClause} {orderClause} {limitClause}

```
{                                        ← 2100
  "name": "DST_ClaimHeader",
  "type": "dataset",
  "parents": [],
  "table_name" : "DST_ClaimHeader_data",
  "fields": [
    {
      "name": "provider_id",
      "valueType": "STRING"
    },
    {
      "name": "paiddate",
      "valueType": "DATE"
    },
    {
      "name": "suffix_id",
      "valueType": "STRING"
    },
    {
      "name": "suffix",
      "valueType": "STRING"
    },
    {
      "name": "total_paid",
      "valueType": "DECIMAL"
    },
    {
      "name": "recipient_id",
      "valueType": "STRING"
    },
    {
      "name": "icn",
      "valueType": "STRING"
    },
    {
      "name": "claim_type",
      "valueType": "STRING"
    },
    {
      "name": "tpi",
      "valueType": "STRING"
    },
    {
      "name": "pcn",
      "valueType": "STRING"
    },
    {
      "name": "statuscode",
      "valueType": "STRING"
    }
  ],
  "execution" : {
    "executor" : "NONE",
    "command" : ""
  }
}
```

FIG. 21

```
                                                    ┌─2210
SELECT claim_type, COALESCE(SUM(total_paid), 0)
FROM DST_ClaimHeader_data WHERE provider_id =
'001A-F432' AND statuscode = 'P' GROUP BY
claim_type
```

FIG. 22A

```
       {                                           ┌─2200
2220──▶"dimensions": [
          "claim_type"
       ],
2230──▶"metric_id": "e4238a38-8f1e-3241-aafe-0066e9b5d5d6",
2235──▶"metrics": {
          "provider_payment": [
             {
2240──▶      "key": "provider_payment_B29FFC83",
2250──▶      "series": [
                {
2252──▶         "claim_type": "MCO-A",
                "value": 1160.0
                },
                {
2256──▶         "claim_type": "FFS",
                "value": 3513.5
                }
             ]
             }
          ]
       },
2260──▶"source": "001A-F432",
2270──▶"source_type": "provider_id"
}
```

FIG. 22B

```
SELECT claim_type, suffix,                    2310
COALESCE(SUM(total_paid), 0) FROM
DST_ClaimHeader_data WHERE provider_id = '001A-
F432' AND statuscode = 'P' GROUP BY claim_type,
suffix
```

FIG. 23A

```
         {
2320──→ "dimensions": [                         2300
           "claim_type",
           "suffix"
         ],
2330──→ "metric_id": "b25e9fcf-0511-3187-8df7-68beb6a40768",
2335──→ "metrics": {
           "provider_payment": [
              {
2340──→      "key": "provider_payment_CF4B111E",
2350──→      "series": [
                {
2352──→         "claim_type": "FFS",
                  "suffix": "2",
                  "value": 728.0
                },
                {
2354──→         "claim_type": "FFS",
                  "suffix": "1",
                  "value": 2785.5
                },
                {
2356──→         "claim_type": "MCO-A",
                  "suffix": "2",
                  "value": 540.5
                },
                {
2358──→         "claim_type": "MCO-A",
                  "suffix": "1",
                  "value": 619.5
                }
              ]
           }
         ]
       },
2360──→ "source": "001A-F432",
2370──→ "source_type": "provider_id"
       }
```

SYSTEM AND METHOD FOR COMPUTING AND MANAGING DATASETS USING HIERARCHICAL ANALYTICS

CROSS-REFERENCE TO RELATED APPLICATIONS

This application claims priority (including priority under 35 U.S.C. § 119(e)) to U.S. Provisional Application No. 62/031,848 filed Jul. 31, 2014, which is incorporated herein by reference in its entirety.

FIELD

Embodiments disclosed herein relate to the field of online analytical processing.

BACKGROUND

Organizing data for optimal understanding is a domain-specific endeavor with several time-tested patterns. Typically when the amount of data gets large, the data organization tends to adhere to patterns that are well supported by analytical tools—e.g. the STAR schema for Fact/Dimension warehouse application. Datasets can be organized in ways that would allow sourcing current analytical platforms to provide insights, but this approach introduces inefficiencies by limiting analysis to techniques provided by the sourced platform.

While analytical insights can be determined by close inspection of records related to a single entity, some of the insights into entities come from comparing different measures (metrics) of one entity against another entity or set of entities. Unfortunately, there is not an exhaustive set of questions to be asked about the data. New questions arise as part of the data investigation process, and the questions change over time as the analyst acquires more familiarity and understanding of the nature of the data and the subject of the investigation. The ability to quickly ask new questions about the data and visualize the answers to the questions is critical to providing financial value to the end-users.

Conventional Data Warehouse projects involve a great deal of planning to ensure that all of the necessary data is available and organized in structures needed to allow interactive investigation of large datasets. To fit the analytic tools in such projects, the data must be organized in ways proscribed by the tools. To meet the analytic requirements of the business the appropriate data must be present in 'schemas' that are highly constrained, making the integration of new data sources a slow process. Reduction of the time required to add new datasets and link them to other datasets will reduce the time-to-insight that is at the heart of the business value. Allowing analysts and end-users to integrate their data into the system without disrupting any current use of existing data is valuable. Should the new data not prove insightful it must also be easy to get it back out of the system, only affecting the specific uses of the new data.

Analysis of the data is an ongoing process, even while new data is being added to the system. Conclusions reached with data available at one point in time must not be invalidated simply due to the inclusion of additional data at a later point in time. It may be that when the new data is taken into account the previous conclusions do change, but the addition of data must not invalidate the analytic process. A conclusion reached using 2010 data should still be valid even after the 2011 data is added to the system.

Reproducibility is also a desirable feature not found in conventional Data Warehouse projects. Ideally, an analytical result based on the state of the data at a point in time, or under specific parameters, should be reproducible at will.

BRIEF DESCRIPTION OF THE DRAWINGS

FIG. 2 depicts an exemplary profile page in an embodiment of a user interface.

FIG. 3 depicts an exemplary detail display page in an embodiment of a user interface FIG. 6 depicts another exemplary profile page in an embodiment of a user interface.

FIG. 8 depicts an exemplary results display page in an embodiment of a user interface.

FIG. 16 depicts an exemplary definition of a metric.

FIG. 17 depicts exemplary expressions to return metric values.

FIG. 20 depicts an exemplary SQL expression.

FIG. 21 depicts an exemplary dataset definition.

FIG. 22A depicts an exemplary SQL expression.

FIG. 22B depicts exemplary pre-computed metric values.

FIG. 23A depicts another exemplary SQL expression.

FIG. 23B depicts other exemplary pre-computed metric values.

SUMMARY OF THE INVENTION

Figure 1:
FIG. 1 depicts an exemplary entry point in an embodiment of a user interface.

An embodiment of a method of displaying current analytical results is disclosed herein. The method includes defining a hierarchy of dataset models, including a first dataset model, each dataset model comprising an analytic and one or more parent datasets, wherein at least one dataset model has a parent dataset that is a primordial dataset, wherein the first dataset model directly or indirectly descends from the primordial dataset; defining an analytical result based on the first data model; creating an instance of each dataset model in the hierarchy of dataset models, wherein each instance of a dataset model comprises data obtained by executing the analytic in the dataset model on the data in valid instances of the one or more parent datasets of the dataset model, creating a first instance of the first dataset model by executing the analytic in the first dataset model on the data in valid instances of the one or more parent datasets of the first dataset model; displaying a first analytical result based on the first instance of the first dataset model; after a change in the primordial dataset, invalidating each instance of a dataset model that directly or indirectly descends from the primordial dataset, including invalidating the first instance of the first dataset model; re-executing, for each invalid instance of a dataset model, the analytic in the corresponding dataset model on the data in the re-executed instances of the one or more parent datasets of the dataset model, including re-executing the analytic in the first dataset model on the data in the re-executed instances of the one or more parent datasets of the first dataset model to create a second instance of the first dataset model, and displaying a second analytical result based on the data comprised in the second instance of the first dataset model.

Also disclosed herein is a system for of displaying current analytical results, comprising a computer system comprising at least one processor and a memory media; persistent storage coupled to the computer system comprising a data store comprising a primordial dataset and a hierarchy of dataset models, including a first dataset model, each dataset model comprising an analytic and one or more parent datasets, wherein at least one dataset model has a parent dataset that is the primordial dataset, and wherein the first dataset model directly or indirectly descends from the primordial dataset; a display interface coupled to the computer system, the display interface adapted and configured to display an analytical result based on the first data model; and instructions which when loaded into the memory media and executed by the processor cause the computer system to perform a method of displaying current analytical results.

Embodiments of the system and method for displaying current analytical results further include a defined metric, wherein the definition of the metric comprises metadata, and storing metric values in a first cache, invalidating the first cache, and storing metric values in a second cache.

Also disclosed herein are embodiments, for use in a method of analysis comprising executing one or more ordered sequences of analytics on a primordial data set, of a method of propagating data changes in the primordial dataset, the method comprising: representing one or more ordered sequences of analytics in a hierarchy of dataset models, wherein each of the dataset models comprises one of the analytics, each dataset model has at least one parent, and each dataset model descends directly or indirectly from a first primordial dataset; instantiating a dataset instance of each dataset model in the hierarchy of dataset models, wherein each dataset instance comprises data and hierarchy metadata, and wherein instantiating an instance of a dataset model comprises executing the analytic associated with the dataset model on the data comprised in valid instances of the parents of the dataset model; after a data change in the first primordial dataset, invalidating each instance of a dataset model that descends directly or indirectly from the first primordial dataset; and for each dataset model that descends directly or indirectly from the first primordial dataset, instantiating a new instance of the dataset model by executing the analytic associated with the dataset model on the data comprised in valid instances of the parents of the dataset model.

Also disclosed herein are embodiments of a system for executing one or more ordered sequences of analytics on a primordial data set and propagating data changes in the primordial dataset, the system comprising: a computer system comprising at least one processor and a memory media; persistent storage coupled to the computer system comprising a data store comprising a first primordial dataset; and instructions which when loaded into the memory media and executed by the processor cause the computer system to perform a method of executing one or more ordered sequences of analytics on a primordial data set and propagating data changes in the primordial dataset.

DETAILED DESCRIPTION

Described herein are embodiments of a hierarchical analytics system ("HAS") and methods of using a HAS. The business value of the HAS described herein is derived from its ability to quickly uncover anomalous behavior of individuals or groups of individuals. Exemplary applications include fraud detection, including detection of fraud in government programs such as, for example, Medicaid fraud. An analogous example is fraud detection by credit card companies which analyzes previous card behavior to make fraud assessments on each new transaction in real time. However, unlike a credit card fraud assessment, the cost of a false positive in Medicaid fraud detection is quite high and the remedy to a true positive is both complex and expensive. Unlike some conventional systems, which depend on machine-learning algorithms for the efficacy of their analytics, embodiments described herein use human-derived analytics (for example, from subject matter experts) to enable these experts to be more efficient in analytic development, with the ultimate goal of reducing the time between data becoming available and insights being produced based on that data. Empowering existing human analysts requires tooling that allows them to ask any question of the data and quickly get an answer, including visualization of the answer, as most questions boil down to tables of related numbers.

Things/Links/Datasets

In embodiments described herein data is organized into Things, Links and Datasets, with Links and Datasets used to provide additional insights into the Things.

Terminology

Thing—An object that represents a concrete type of element in the domain model. Examples of Things relevant to detection of Medicaid fraud in an embodiment include Provider, Recipient, Suffix (or Location), TaxID, Provider ID, open case, and closed case.

Link—A relationship between two things (or Linkables). A relationship has a type, such that there may be more than one Link between the same two things with each Link inferring a different relationship.

Dataset—A well-defined single table of data, plus metadata that can be used to construct the table of data. Metadata includes parents (other datasets used as inputs), fields (the schema of the table), commands (instructions used to create the data in the table) and parameters (values used to alter the behavior of the command in predictable ways).

Analytic—A set of one or more analytic functions that produce a dataset.

Design and Construction of Analytics

Construction of analytics is a complicated human-driven and domain-specific endeavor. While many of the analytic techniques may apply to multiple domains, the underlying data is domain (and even customer) specific. Being able to construct analytics that can be easily adapted to (slightly) different datasets brings the benefits of analytic re-use. Breaking analytics into modular components that can be reused, and using the appropriate analytic evaluation language, both decrease the time required to produce new insights.

New analytics may be produced for each user, and existing analytics to be modified to better match the input data and understanding of the question. During the construction/tuning/test period an analytic may be executed many times, with the previous results discarded as modifications are made. Analytics may need to be 'tested' on data that is in production and changing over time.

Bookkeeping for Parametric Instantiation of Datasets

A fertile imagination can produce hundreds of distinct analytics in a given domain, with many of the analytics being parametric. A parametric analytic is an analytic that uses user-provided parameters to affect the analytical computations. Some parameters may be used to reduce the scope of the analytic—e.g. providers of a certain type in a limited geography. Other parameters may be used to alter the mathematical boundaries—e.g. only records outside of 3 standard deviations from the mean. If there are 100 different analytics, and each analytic has 20 distinct parameter 'sets' (unique combinations of parameter values), the number of resulting datasets grows quickly, so that the bookkeeping of the datasets becomes a burden.

Computational Complexity

Existing analytics vary in complexity, but a modest analytic may involve 3-4 input datasets with 5+ temporary tables produced during the construction of the final dataset. When this level of complexity is coupled with parametric inputs in a multi-user environment, simple management of the temporary tables becomes a problem (due to concurrent execution of the analytic with different parameters).

Multi-Executor

Some types of computations are better suited for specific languages or execution environments. For example, computing a k-means cluster in SQL would be absurdly complex, but computing it with R is simple. Computing A:B population intersections for a large set of entities is hard in SQL, slow in R, but easy and fast in Groovy. Support for different analytical execution environments removes barriers to 'getting to the answer quickly'.

Monolithic Blocks Vs Decomposition

It is possible to write a complex analytic in SQL that uses several temporary tables in its computation, but the use of temporary tables becomes an impediment to concurrent execution. If analytic construction is viewed as being similar to other types of programming, the notion of 'functions' arises where a complex analytic can be broken into several functions, with one function using as input the outputs of other function(s). By exposing the functions as 'intermediate' datasets, concurrency is possible (no temporary table collisions) and reuse of the intermediate results becomes simple.

Consistency Between Things/Links/Datasets

Embodiments employ three primitive modeling types—Things, Links, and Datasets—to represent the data in a form that is suitable for analysis. The contents of some datasets are derived from the Things/Links—e.g. number of connected providers with open cases uses provider things plus the links to other providers as the aggregation for the value. The always-on nature of the system means that Things and Links are changing over time. To ensure that the datasets that are computed from Thing/Link data are always correct (because datasets back the metrics used in profile pages), embodiments provide the appearance of atomic change behavior across Things/Links/Datasets, while not disrupting existing uses of the current data.

The embodiments of a HAS described herein are implemented on one or more computer systems, not depicted herein. Exemplary computer systems suitable for use with embodiments of a HAS include one or more processors, one or more memory media, one or more persistent storage media, one or more display devices, including monitors, tablet screens, and phone displays, and one or more input devices, including pointer devices, keyboards, tablets, and phone input devices. Persistent storage media and memory media store the data and data structures used by the HAS. The computer system may be integrated in a single unit or may include any combination of two or more computer systems or portions of computer systems (e.g., persistent storage units) distributed over multiple units interconnected locally over, for example, a LAN, or remotely over, for example, a WAN, a public data network such as the Web or the Internet, a telecommunications network, or a wireless data or telecommunications network. A user may use and access a locally-hosted HAS or may obtain HAS service from a remotely-located server via a client/server or Software as a Service arrangement. In an embodiment, the platform is a Java 7 environment.

21CT, Inc. of Austin, Tex. offers exemplary HAS services under the trademark and service mark Torch.

Embodiments of a HAS include a user interface that employs an HTML-based Web page-type interface. FIG. 1 depicts an exemplary entry point 100 in an embodiment of a user interface. Entry point 100 includes search facility 110, recent history display 120, and analytics 130. In an embodiment, the user can input search criteria into search facility 110, and the HAS will search the data and return a list of Things satisfying the search criteria (not depicted). The exemplary search results include an entry for a fictitious provider named "James Sabourin" (not depicted) and the user has selected that entry for further investigation.

FIG. 2 depicts an exemplary profile page 200 in an embodiment of a user interface for the exemplary provider named "James Sabourin." Profile page 200 displays basic ID data for the provider. Exemplary profile page 200 also displays multiple panels displaying other pertinent data regarding the profiled provider or other Thing. Some of the exemplary panels display the results of pre-selected analytics pertaining to the profiled provider or other Thing. Panels 220 and 245 depict information regarding the provider's claims history, panels 230 and 240 list the top five procedures by amount and top five diagnoses by count, and panel 250 displays the total of all claims paid. Some panels also highlight Links to other Things. Panel 210 displays the number of open cases associated with the provider (which in this case is 0), panel 215 displays the number of other Providers with Case Histories to which James Sabourin is connected or Linked, and panel 260 lists the locations (or suffixes) associated with the provider and identifies the number of other providers associated with the location. Panel 270 shows the locations on a map. Panel 225 shows the level of recent profile activity. Another panel, not depicted in FIG. 2, identifies other providers within a criteria-based peer group for the profiled provider. The panels described herein are exemplary, and embodiments allow the user to select and customize the selection, content, and layout of the panels on the profile page and the analytics that provide the data displayed in the panels. The HAS embodiments described herein ensure that the analytical results displayed in the profile are based on the most current data by flagging the underlying datasets as invalid, if the underlying data has changed, and re-computing all affected datasets before displaying the profile. This process occurs for all analytics whose results are displayed in the profile. From the profile's point of view, multiple tables appear to change at the same time, thereby providing the appearance of atomic composition and atomic change.

In embodiments, the user can "drill down" and view the supporting detail for the data displayed in a panel. Panel 215 includes icon 280, which signals to the user that supporting details are available for the data displayed in panel 215. In an embodiment, the supporting details come from a dataset. FIG. 3 depicts an exemplary user interface detail page 300 displaying the details of the data displayed in panel 215. Panel 215 indicated that James Sabourin was connected to three other providers with Case History, and the data display page 300 displays summary information and details regarding each of the three connected providers.

Figure 4:
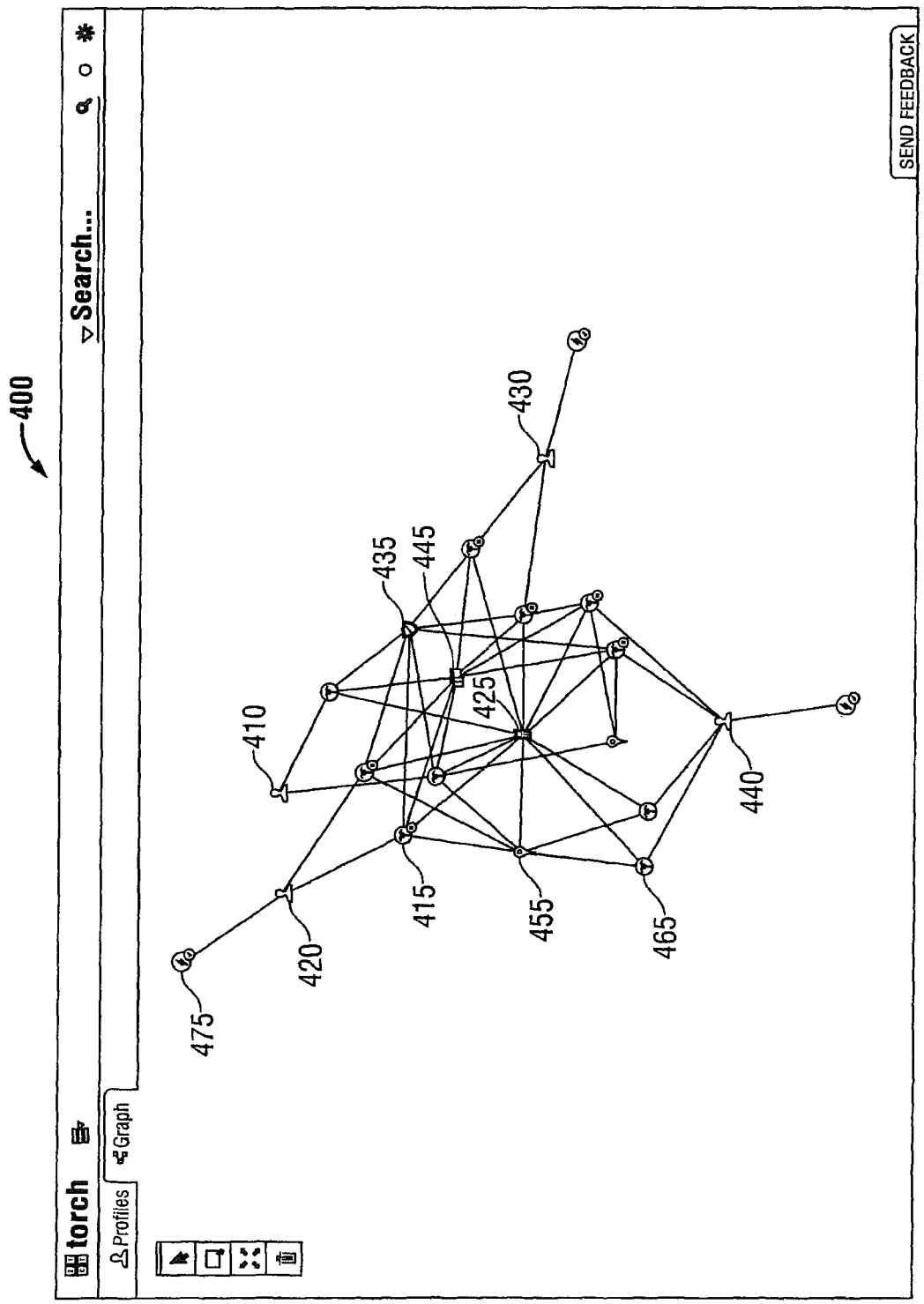
FIG. 4 depicts an exemplary graph display page in an embodiment of a user interface

Embodiments also allow the user to display the data in graph format to visually display the Links between Things of interest. The exemplary user interface graph display page 400 shown in FIG. 4 displays in graph format the Links between the provider under investigation, James Sabourin (410), the three providers shown in detail page 300 (FIG. 3)—Dreama Guys (440), Tamar Vanhee (430), and Vita Yglesias (420)—and other Things, including primary locations (suffix 01) (415), geographic locations (455), secondary locations (suffix 02, 03, etc.) (465), taxID numbers (435), bank account (445), phone numbers (425), and closed cases (475). In an embodiment (not depicted), the graph-format display of the date displays text (for example, a Thing ID or other descriptive information) next to every node element in the graph.

Figure 5:
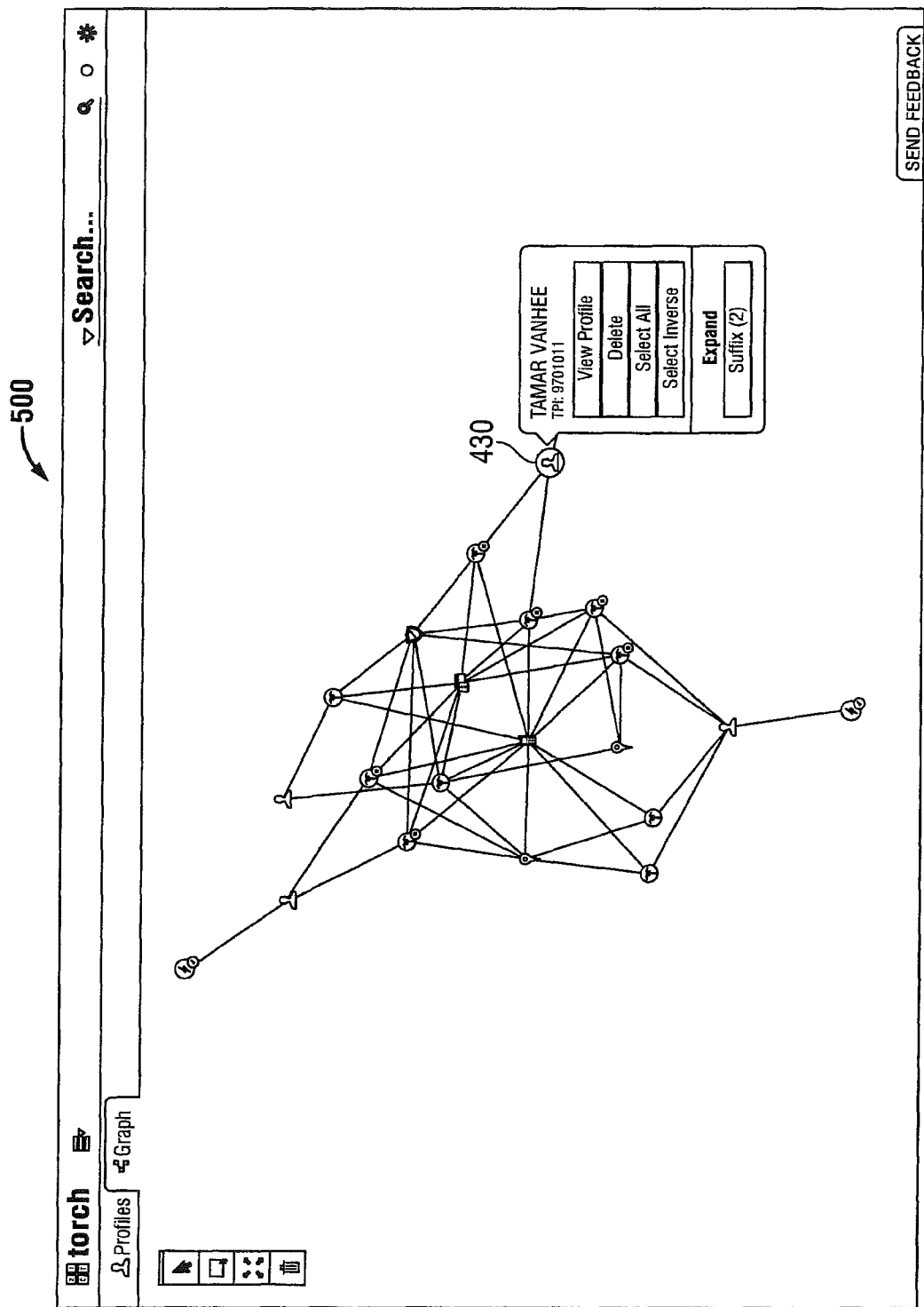
FIG. 5 depicts another view of an exemplary graph display page in an embodiment of a user interface

The user can select any Thing of interest on the graph display page. In the exemplary user interface page 500 shown in FIG. 5, the user has selected node 430 associated with provider Tamar Vanhee and can choose between viewing the profile of Tamar Vanhee, deleting the node, selecting all similar Things, or Selecting Inverse, i.e., all similar Things except Tamar Vanhee. FIG. 6 depicts the exemplary profile page 600 for provider Tamar Vanhee, selected from graph display page 400.

Figure 7:
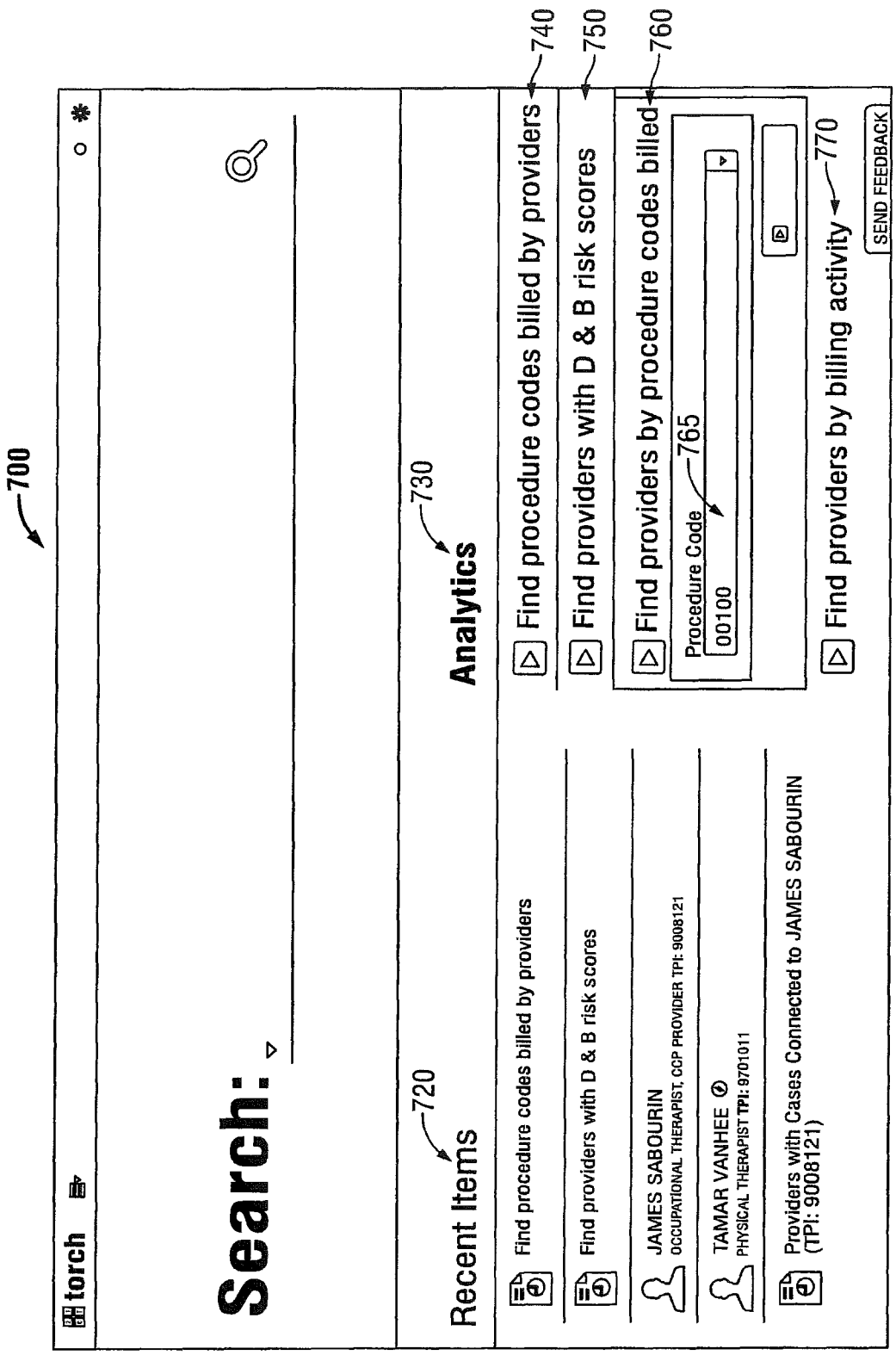
FIG. 7 depicts another view of an exemplary entry point in an embodiment of a user interface.

In the exemplary user interface page 700 depicted in FIG. 7, the user has returned to the entry page, which now includes the history (720) of the recently-viewed profiles and detailed data. Entry page 700 reveals several previously-created analytics that are available to the user to retrieve Things of interest in the data, including analytic 740, which retrieves all procedure codes billed by providers, analytic 750, which retrieves providers with D&B risk scores, analytic 760, which retrieves providers by procedure codes billed, and analytic 770, which retrieves providers by billing activity. Embodiments of a HAS also enable the user to design other analytics and to select and execute the custom analytics via the user interface.

Figure 9:
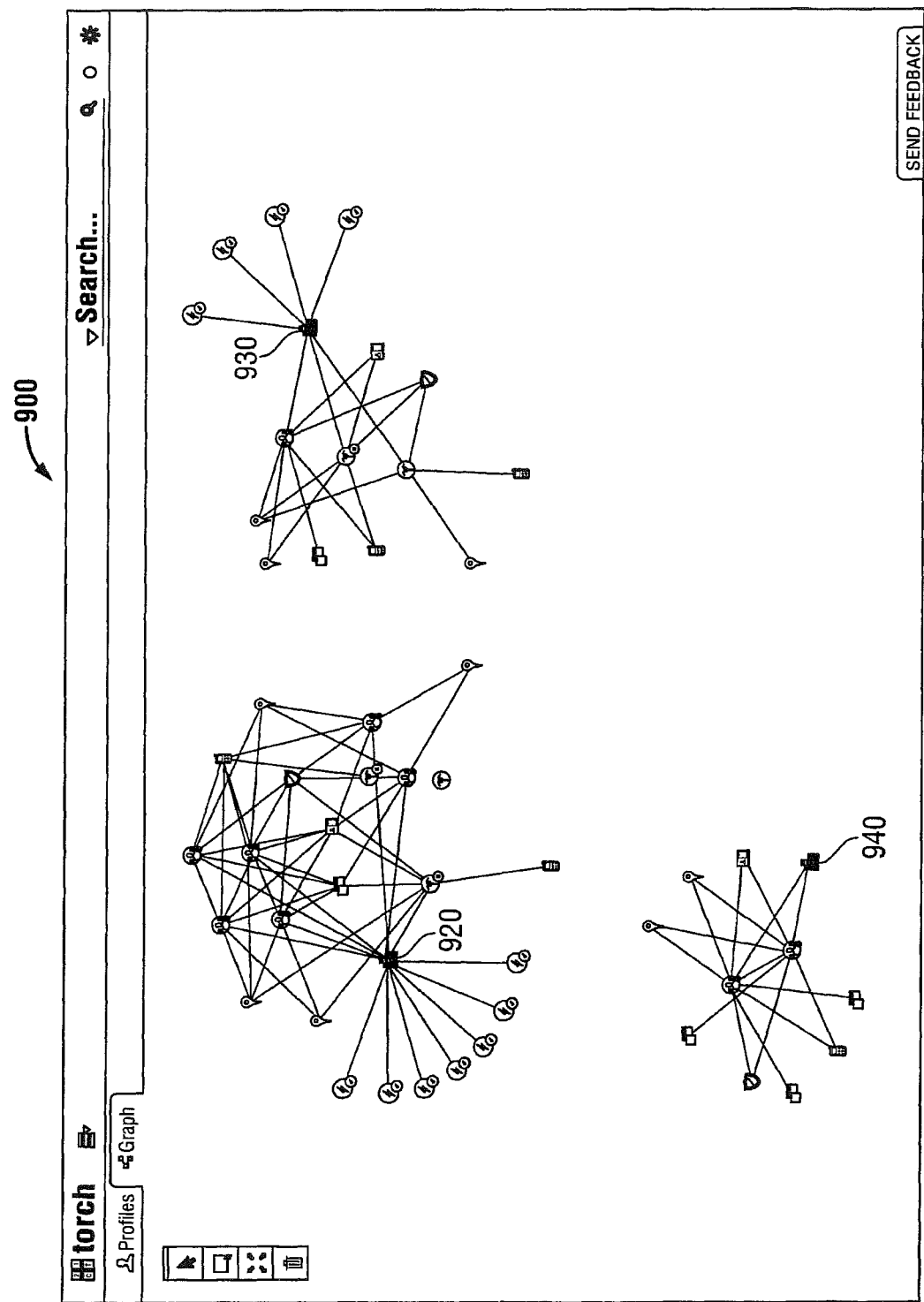
FIG. 9 depicts another view of an exemplary graph display page in an embodiment of a user interface.

FIG. 7 shows that the user has selected analytic 760 with procedure code 00100 as an input parameter (765). The exemplary user interface screen 800 in FIG. 8 displays in tabular format the output of the analytic, i.e., all the providers that have billed for procedure code 00100. Exemplary user interface screen 800 also includes button 810, which allows the user to select additional items to the graph display, and user interface screen shows that providers 820, 830, and 840 have been selected for graph display. The exemplary user interface graph display page 900 in FIG. 9 shows in graph format the provider groups (920, 930, and 940) corresponding to the selected providers (820, 830, and 840) and associated Links.

This section describes how datasets are implemented in an embodiment of a HAS, including their construction, evaluation, lifecycle and management.

Embodiments of a HAS preferably store data from any number of sources and formats in a polyglot datastore. In an embodiment, the polyglot data store comprises a column-oriented DBMS managed with the HP Vertica Analytics Platform for storage of data. Elastic Search, essentially a distributed and elastically scalable version of the Inverted Text Index mechanism Lucene, is used in an embodiment as the engine to store/retrieve Things and Links. The two data stores (Vertica and Elastic Search) make up the Primitives Store in an embodiment of a HAS. Things and Links are stored in Elastic Search, and Datasets are stored in both, with the metadata stored in Elastic Search and the table data stored in Vertica. The platform ensures that references to DataSets, Things or Links resolve across all the stores in the Polyglot. The precise storage systems used in the embodiments herein (Vertica and Elastic Search) can be replaced by other storage technologies.

Preferably the process of ingesting new data into the datastore includes enriching the data, for example, by adding to each row of newly-ingested data one or more Links to one or more Things.

Model and Lineage. Datasets are organized in hierarchy, with each dataset (except primordial datasets) having one or more 'parents'. Each dataset has a model or definition that allows the system to construct the dataset data on demand. The dataset model includes parents (datasets that are sources of input data), a command to be executed that produces the data, fields that describe the resulting data, and optional parameters that influence the execution of the command. Datasets that have no parents are considered 'primordial'; primordial datasets reference data (via a table name) that already exists. A primordial dataset model has no command or parameters, but does have fields that describe the data. In an embodiment the data for a primordial dataset is provided by external processes. In an embodiment used for Medicaid fraud detection, exemplary primordial datasets include claims data files and State provider suffix files. (Some States, Texas for example, that provide Medicaid services keep the lists of Medicaid providers organized by Suffix. A provider Suffix is simply a specialty for which the provider provides Medicaid services, e.g., Cardiologist @ Central Hospital, and each unique pair of location/medical specialty constitutes a "Suffix.") In an embodiment, a user can add other primordial datasets to the HAS and link the new primordial datasets to others via analytics. For example, a user may add dataset of suspected fraudulent social security numbers as a primordial data set and use analytics to filter other datasets to limit the results to the intersection between the fraudulent SSN table and the larger table.

Figure 10:
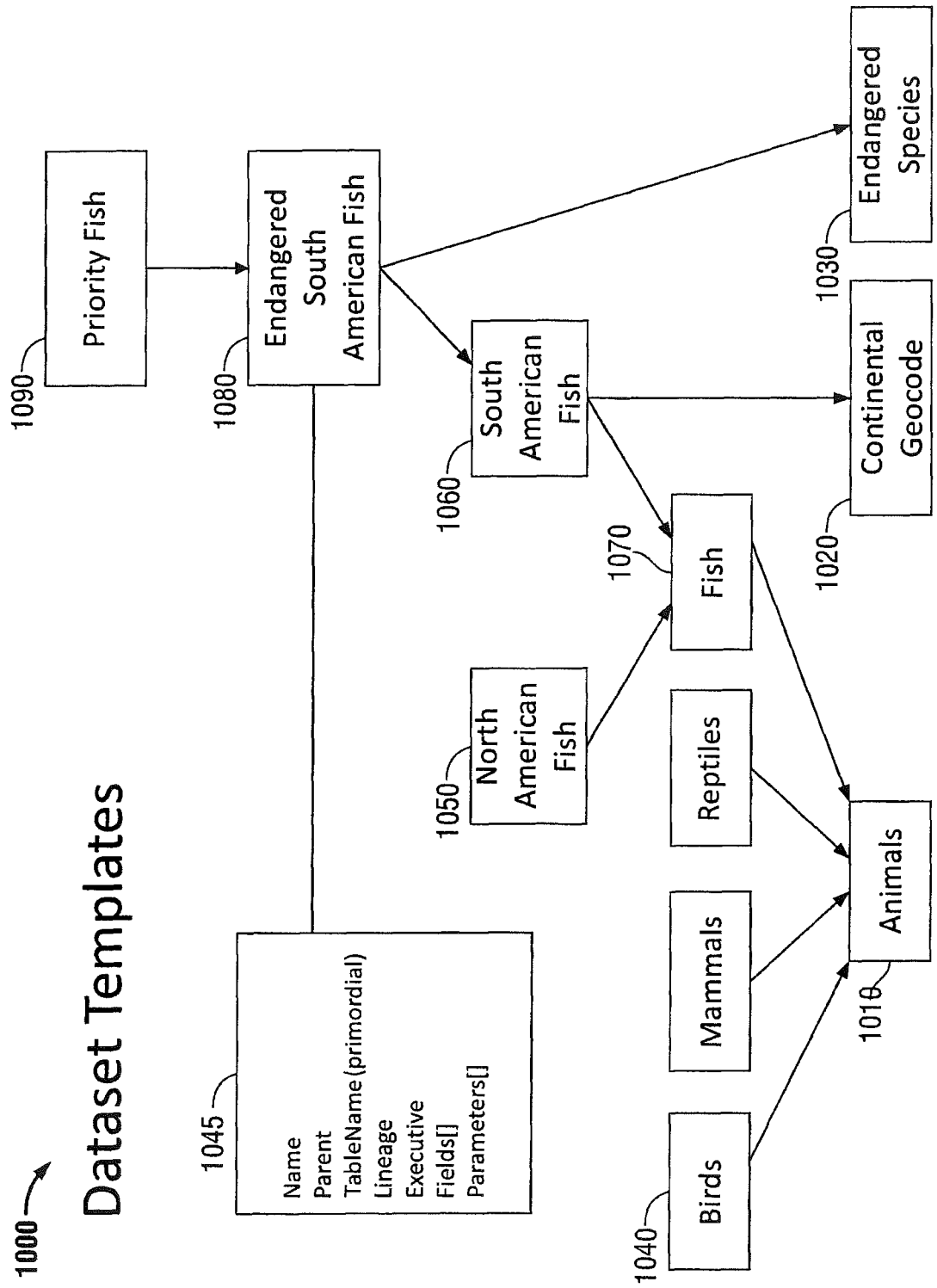
FIG. 10 depicts an exemplary hierarchy of dataset models.

FIG. 10 depicts an exemplary hierarchy 1000 of dataset models (or templates). Hierarchy 1000 includes primordial datasets 1010 (Animals), 1020 (Continental Geocodes), and 1030 (Endangered species). Dataset models 1040 (Birds) and 1070 (Fish), share a single parent, primordial dataset 1010 (Animals). Dataset model 1050 (North American Fish) has a single parent, dataset model 1070 (Fish), whereas dataset model 1060 (South American Fish) has two parents, dataset model 1070 (Fish) and primordial dataset 1020 (Continental Geocode).

FIG. 10 also depicts exemplary metadata 1045 for a dataset model in an embodiment. Exemplary metadata 1045 includes: Name, the name of the dataset; Parent, the parents of the dataset, if the dataset is non-primordial; TableName, the table name if the dataset is primordial; Lineage, the information required to compute a dataset; Executive, information regarding the environment of the command that creates the dataset from the parent or datasets; Fields, types and descriptions of the data stored in the dataset, and Parameters, types and descriptions of optional parameters that influence the execution of the command. Other types of metadata may also be maintained for a dataset model.

An instance of a non-primordial dataset is created when a dataset is 'executed,' or created by executing the dataset command using the parents as input data and specified parameters. Each instance includes a structure that describes the execution particulars (parameters, parent instances, etc.) and the name of a table in the columnar DBMS (Vertica, in an embodiment) that holds the data produced by the execution of the analytic.

Lineage refers to the information required to compute an instance of a dataset. In an embodiment Lineage data is a combination of the names of the parents, the command, and the parameters. Lineage is evaluated at each level. Evaluation of lineage across multiple levels decomposes to evaluation of the lineage at each step.

Figure 11:
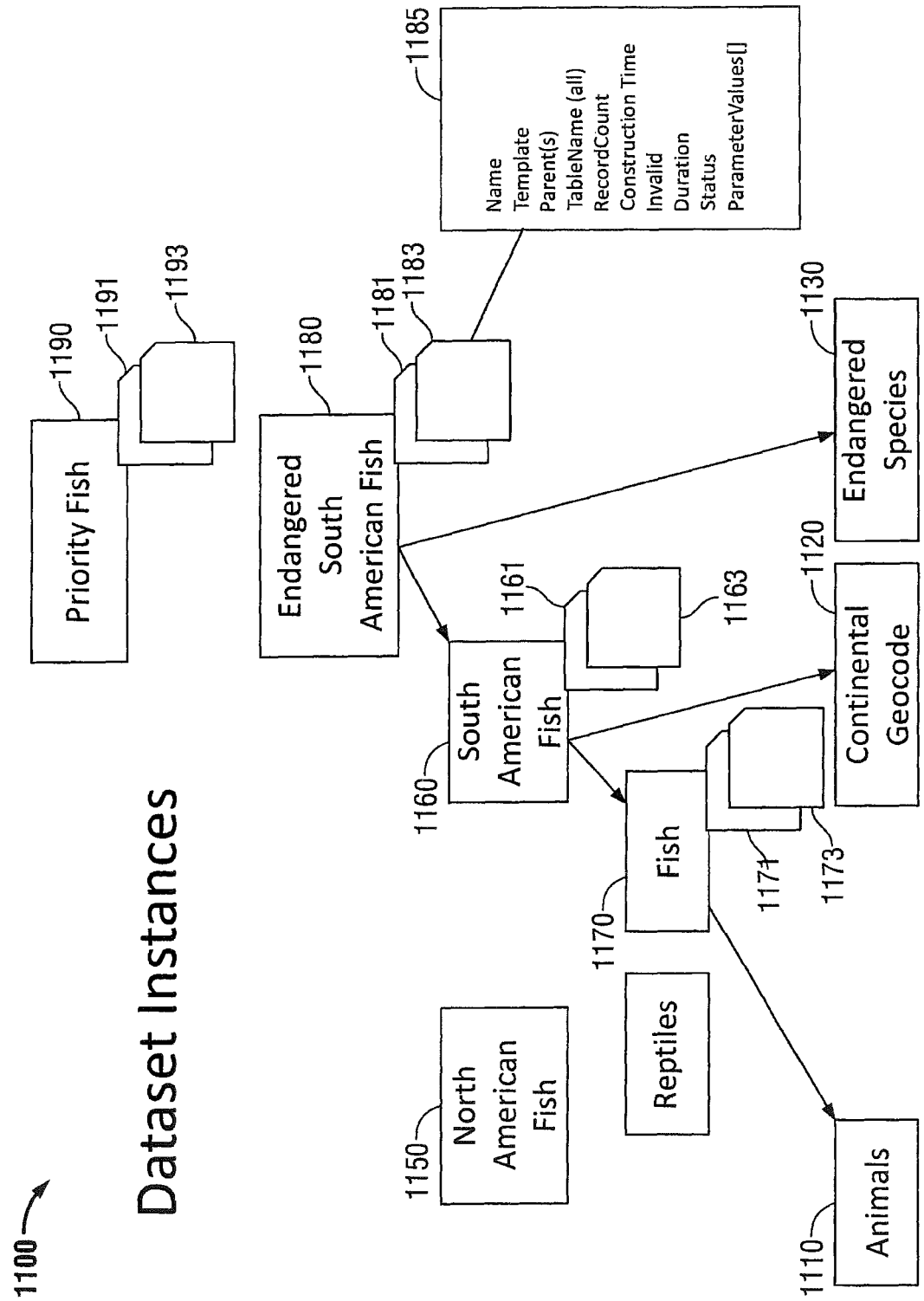
FIG. 11 depicts exemplary dataset instances.

FIG. 11 depicts an exemplary hierarchy 1100 of dataset instances based on hierarchy 1000 of dataset models. Hierarchy 1100 includes the same primordial datasets 1110 (Animals), 1120 (Continental Geocode), and 1130 (Endangered species). Dataset model 1170 (Fish) has two instances, 1171, 1173; dataset model 1160 (South American Fish) has two instances 1161, 1163; dataset model 1180 (Endangered South American Fish) has two instances 1181, 1183; and dataset model 1190 (Priority Fish) has two instances 1191, 1193.

FIG. 11 also depicts exemplary metadata 1185 for a dataset instance in an embodiment. The metadata includes Name, the name of the dataset instance; Model (or Template), the name of the dataset model which it instantiates; Parent(s), the parent dataset instances; TableName, the unique name of the unique table in the Vertica DBMS that stores the data retrieved by execution of the command; RecordCount, the number of records in the table in the dataset instance; Construction Time, when the dataset instance was constructed; Duration, how long it took to construct the dataset instance; Status, whether the construction of the dataset instance is complete or in process; ParameterValues, the specific parameter values used to construct this dataset instance; and Invalid, a flag that can be set to indicates that the dataset instance is no longer valid.

Other types of metadata may also be maintained for a dataset instance. For example, metadata for a dataset instance may include fingerprint data that can be used to determine if the data in the table has been modified. A dataset fingerprint preferably is a hash of all columns and rows of the data, plus a few other attributes about the table. Fingerprints can be computed quickly and are stored with the other meta information about the dataset. Fingerprints would typically be checked if there was reason to believe data in a table was changed by some external process, or if there is a desire to verify the authenticity of a chain of datasets. A dataset instance may have a "lease" value, which enables or authorizes deletion of intermediate and/or reproducible datasets after the lease period has expired, or a "transient" value, which identifies a data set that can be immediately discarded.

In an embodiment, each model and instance is stored as a JSON (Javascript object notation) document in Elastic Search, each instance references a table in Vertica, the organization of the hierarchy of datasets is in the Vertica documents, and the tabular data is in Vertica.

Datasets in an embodiment of a HAS have these features and properties:

Hierarchical. Datasets are organized in hierarchies, with a dataset having one or more parents (zero for primordial datasets). Computation of a dataset uses its parents as input data. The dataset models define the hierarchy, and the computed dataset instances reflect the same hierarchy albeit between dataset instances rather than models.

Single target. multi parent (joins). The computation of a dataset produces exactly one new dataset and one table of data. This table of data is stored in a DBMS (as a single table). The computation of a dataset also produces a metadata object that includes the name of the DBMS table, the names of the parent datasets, and other information about the computation of the data.

Construction, testing, evolution. A dataset model is expected to evolve over time. Dataset models evolve as new insights into the data are identified, and they evolve due to mistakes in understanding the data originally. Datasets are first and foremost investigations into the data. It is expected that that datasets will be modified repeatedly during their lifetime. To enable this, embodiments of a HAS support hierarchical operations on datasets. For example, if a dataset is found to have an incorrect definition it will be possible (with a single command) to invalidate (and delete) all datasets that used the now-incorrect dataset as a parent, either directly or indirectly.

Parents of a to-be-constructed dataset instance are themselves dataset instances. A new child will use the newest instance of a parent model that is valid and was constructed with the same parameters. If no such parent exists, it will be constructed first. By adding the 'is valid' test to construction of children, simply marking dataset instances invalid is sufficient to ensure they will not be used in future computations, without requiring the deletion of the dataset (which may be in use by an ongoing investigation). Because each dataset records the instance names of its parents, all datasets that are descendants of a specific dataset can be located quickly. This technique supports quick invalidation of dataset instances when a primordial table is changed.

Meta and Storage. When a dataset is constructed (or computed) an object is created that contains meta information about the dataset, and if the computation of the dataset completes normally a table in the DBMS is created that holds the dataset's data. The meta information includes things like how many records are in the data, when the dataset was constructed and how long execution of the command took. It also includes the exact parents used as inputs to the construction. A dataset model specifies its parents by the model name, but the parents of a constructed dataset are dataset instance names.

Evolving Primordials and Invalidation. Primordial datasets are datasets that refer to data in an existing table that is not controlled by the dataset itself. Deleting a primordial dataset does not result in the DBMS table being deleted because the primordial dataset is aware that it does not control the lifecycle of the table. The data in a primordial dataset table can change at any time, without the dataset being aware of the change. When a process changes the data in a primordial dataset table, it also has the responsibility to mark all consumers of the primordial table as 'invalid'. When a dataset is marked as invalid, it will not be used in further computations by child datasets. Invalidation is a hierarchical operation such that marking a dataset invalid will mark all datasets that used that dataset as input (directly and indirectly) as invalid. An invalid dataset will not be used for any further computations, but is still available to the user interface.

An exemplary process for invalidating datasets is as follows: After a process changes the data in a primordial dataset in some way, the process then flags as invalid each dataset that depends on the data in the primordial dataset. It does this recursively as follows: first, by searching for all valid dataset instances that have the primordial dataset as a parent and setting the "invalid" flag for each of these first-level dataset instances; next, for each of these invalidated first-level dataset instances, repeating the process for all valid dataset instances that have the invalidated first-level dataset instance as a parent; and repeating that process until all dataset instances that depend directly or indirectly on the primordial dataset have been invalidated.

In an embodiment, there are two parallel trees, the model tree, and the instance tree. In either tree any node can be a starting point to query a node for its parents, or a query to the tree for the node's children. All nodes in the tree are 'searchable' on their parents. So the tree itself can be queried (via search) for all nodes that have parent X, and this process recursively happens with one call per level. An algorithm used to traverse trees in an embodiment instantiates both trees in memory during the execution of an analytic, as well as during invalidation and deletion. Any dataset operation that requires parent/child traversal causes it to happen. Tree traversals start from both ends of the tree. Dataset invalidation (mostly primordial, but other datasets can be invalidated as well) will walk up the tree which requires a query for each step. Dataset computation walks down the tree, which is still a query, but a much more targeted query, including match by type name, parameter code and status. Because each node in the tree holds the name of its direct parents, full tree construction requires multiple iterations.

Relationships to Things. Each dataset model declares the fields that must be present in the dataset data. A field is analogous to a DBMS table column. Each field definition includes the type of data held in the field, and optimally should include a description of the field. Most field types are analogous to (a subset of) DBMS data types, however a field may be a thing-reference type. In DBMS terms this is just a string, but in embodiments of a HAS this is an ID (and inferred type) that provides an unambiguous reference to a Thing. A dataset may have multiple thing-reference fields. For example a claim record expressed in a dataset might have a provider reference and a recipient reference field. By designating a field as a reference type, the presentation of the dataset is able to make the values of that field 'link' to the thing itself. Further, the presentation is able to display a dataset in a graph by including the thing references in the graph, possibly annotating them with some other field(s) in the dataset.

Preservation of dimensionality. When implementing interactive visual display of tables of data, either in tabular or graphical/chart form, there is an implementation desire to optimize to ensure the user interface is sufficiently performant to be useable. One typical optimization is to reduce the total amount of data to be returned. However, many datasets are dimensional in nature. Dimensional data provides additional insights when analyzed along the different dimensions. Since the value provided by the system is insight into the data, premature compression of dimensions results in less insight. A dataset should specify which fields are 'dimensions', enabling the presentation layer to automatically enable different views of the data predicated on the available dimensions. Using claim data as an example, the date of a claim is an obvious dimension. Choosing to 'pivot' by the claim date causes the dataset chart to have a time axis which shows claims as a function of time. Using the same claim data as an example, each claim has a 'procedure code' which would also be a valid dimension. Using 'procedure code' as a pivot a bar chart would result with each bar representing a different procedure code. The size of the bar could be # of claims, or $ total of claims. A chart (on the same dataset) could use both time and procedure code as pivots, resulting in a multi-series time series where each series represents a different procedure code.

The design of a dataset must take dimensions into account, being aware that leaving dimensions uncompressed improves visual analysis but reduces interactive performance (without careful tuning). When a dataset size can be constrained by parameter values, including uncompressed dimensions may not result in poor visual performance. Examples of parameter values could be provider ID, start and end date, and selected procedure codes.

Computation. Transformation of a dataset model into a dataset instance is computation. Since the desired dataset may be at the top of a tree of datasets, computation of one dataset will often result in computation of multiple datasets. Computation in an embodiment preferably involves the following steps:

Parametric substitution. Prior to the execution of a dataset command, the parameters provided to the execution are substituted into the command. Even when there are no parameters, there are still some substitutions occurring. For example, a SQL command cannot know in advance the names of the input data tables, or the name of the output data table. To enable more flexibility in SQL command construction, specifically in where clause construction, parameters also have the notion of null where a null parameter is excluded from where clause expansion, and isnull which invokes the is [not] null sql tests. To meet usability goals, all parameters for all datasets in the computation tree are gathered prior to execution. Since the parameters influence the content of each dataset, a dataset can only be re-used if the parameters provided to the dataset and all of its parents are identical.

Analyze Down, compute up. The user typically wants to compute a single dataset at the top of an arbitrary depth tree. Before the dataset can be computed, values for parameters must be obtained. This requires walking from the target dataset though all parents (recursively) to collect all parameters needed for all dataset (so parameters are requested at one time, in an embodiment). Parameters (defined in the dataset model) may have default values, and parameters may have more than one value. A parameter may be declared as required such that it must have a value (including null). Once all required parameter have values, computation starts at the bottom of the tree, i.e., the datasets whose parents are primordial datasets, and works its way back up to the target dataset.

Re-use of intermediate results. Breaking an analytic into smaller elements enables re-use of the dataset logic, but more importantly allows multiple consumers of the dataset. Imagine a SQL join over two large tables that takes a long time. If two different datasets could use that result as input, then there is a net time savings when one computation can re-use the expensive dataset computed by the other. Since the data resulting from computation is dependent on the provided parameters, intermediate result re-use requires that all parameters from the previous execution exactly match the parameters in the re-execution.

Parallelizable. With dataset computation based on trees of intermediate datasets, there are places where more than one intermediate dataset have no common dependencies and are therefore able to execute in parallel. This is especially important for executives, for example, R-language analytics and complex SQL analytics, which tend to be single threaded.

Multiple executives/Executor agnostic. Analytic processing has two primary phases—data i/o, and logic processing. Different languages have different capabilities in logic processing. Computing k-means clustering in SQL is a very difficult problem, but doing it in R is simple. Group by aggregation is trivial in SQL, but performs slowly in R. Doing A:B population comparison is hard and slow in SQL and R, but simple and fast in Groovy. In the Java 7 platform used in an embodiment, the HAS includes one or more executors capable of parsing and executing commands in different formats or languages. In embodiments, exemplary command formats and languages include SQL, R, Groovy, and Python. Each dataset model includes a command to be executed to produce the data. This command, in an embodiment, is a text string (and may include parameters) that is a well-formed executable expression in a selected language and which can be provided to a task-specific executor for parsing and execution. By designing the abstraction to be executor-agnostic, task-specific executors can be brought to bear to make analytic design easier and execution faster.

Reproducibility. Because of the housekeeping data and structures maintained in the embodiments of a HAS disclosed herein, a user is always able to reproduce the parameters and data sources that support a specific analytical result. When the underlying data has not changed, the user can reproduce the same results at will.

Fencing. The always-on nature of a HAS means that the contents of the primordial tables will change from time to time as part of the incremental loading process. When primordial tables change, it means that datasets that were computed in the past would now give a different answer, which is a problem for validating existing datasets. One solution, in an embodiment, is insert a fence dataset on top of the primordial dataset that is a copy of the primordial dataset. This fence dataset can be expensive to create if the primordial dataset is large, but it allows the construction of an analytic tree that will always give the same answer when recomputed by isolating the computation from the changing data (by creating the copy). Fencing is a very simple, but powerful feature of embodiments of a HAS. It allows the computation of an analytic to isolate itself from changes in the primordial data. If the primordial data is changing on a weekly basis, but the use of an analytic spans months (for example, while building a legal case), fencing allows the top-level analytic to be precisely recomputed at any time, independent of the current status of the primordial table. The HAS is aware that it has made a primordial copy for this purpose, and manages the table accordingly.

Management. Datasets are organized into tree structures with some percentage of the datasets used strictly as intermediate results and having no direct visualization. Other datasets that are marked as 'display' datasets are expected to have their data exposed visually. Management of datasets makes use of this information to help inform dataset management.

Pre-computation. Some datasets are possible to compute before they are displayed. Specifically, datasets that do not require parameters are candidates for pre-computation. If a dataset is marked as a 'display' dataset, or if a dataset is the source for a metric it will be selected for pre-computation ensuring the data will be available to the UI in an interactive setting.

Promotion for display. The datasets that are pre-computation targets will be promoted for display after they have been computed. Display promotion includes copying the dataset to the 'presentation' DBMS servers, and having query-specific projections created.

Cleanup based on usage/leaves. As the number of dataset instances increases there may be the need to maintain an upper limit on the storage used by the DBMS. Here there are several hints available to help select the appropriate tables to delete. Each time a dataset is read, the instance records the time of the read, so an LRU algorithm could be used. Only some datasets are promoted for display, so the datasets that are not displayed (only used as intermediate tables in computation) are also good candidates for cleanup. The time required to compute each dataset is recorded, so less 'expensive' datasets could be selected. Finally, dataset sizes (numbers of rows and fields) is also captured, so the size can be used as part of the selection algorithm.

Computation prediction based on previous attempts. When a dataset needs to be computed as part of instruction from the user interface, previous computation times may be available, either because the dataset was previously computed and invalidated, or because it was previously computed with different parameters. Either way, a response to the computation request might be able to provide insight into approximately how long it will take to get the new results.

Visualization/Exploration. The end-user value of datasets is to provide insights into the data. The definition and computation of datasets only provides part of the result. The analytical results must be presented to the user to maximize the analytical value.

Interactive performance. The user may want to see the data as a chart, or overlaid on the graph, or as a table. The user will certainly want to sort/filter and pivot the data. And they will be doing this interactively, which means responses to the user flipping the data about will need to be fast—3 seconds max. For large datasets, this poses a challenge.

Hints in the meta. The dataset meta data will provide user-digestible descriptions of the dataset and of the fields (columns) in the data, and will provide information about which columns are dimensions. The meta will also indicate which datasets are to be exposed as user-facing analytics (as opposed to analytics that are directly tied to the UI or tied to a metric).

Construction may be tailored for a specific visualization. Most dataset visualizations can be applied to any dataset, but some datasets may have multiple 'optimal' visualizations. For example, peer-group analytics are fundamentally a data distribution view, where the expected analysis requires understanding the distribution of the data.

Peer group analysis (PGA) detects individuals or Things that behave or begin to behave in a way different from other individuals or Things identified as being in the same peer group.

Figure 12:
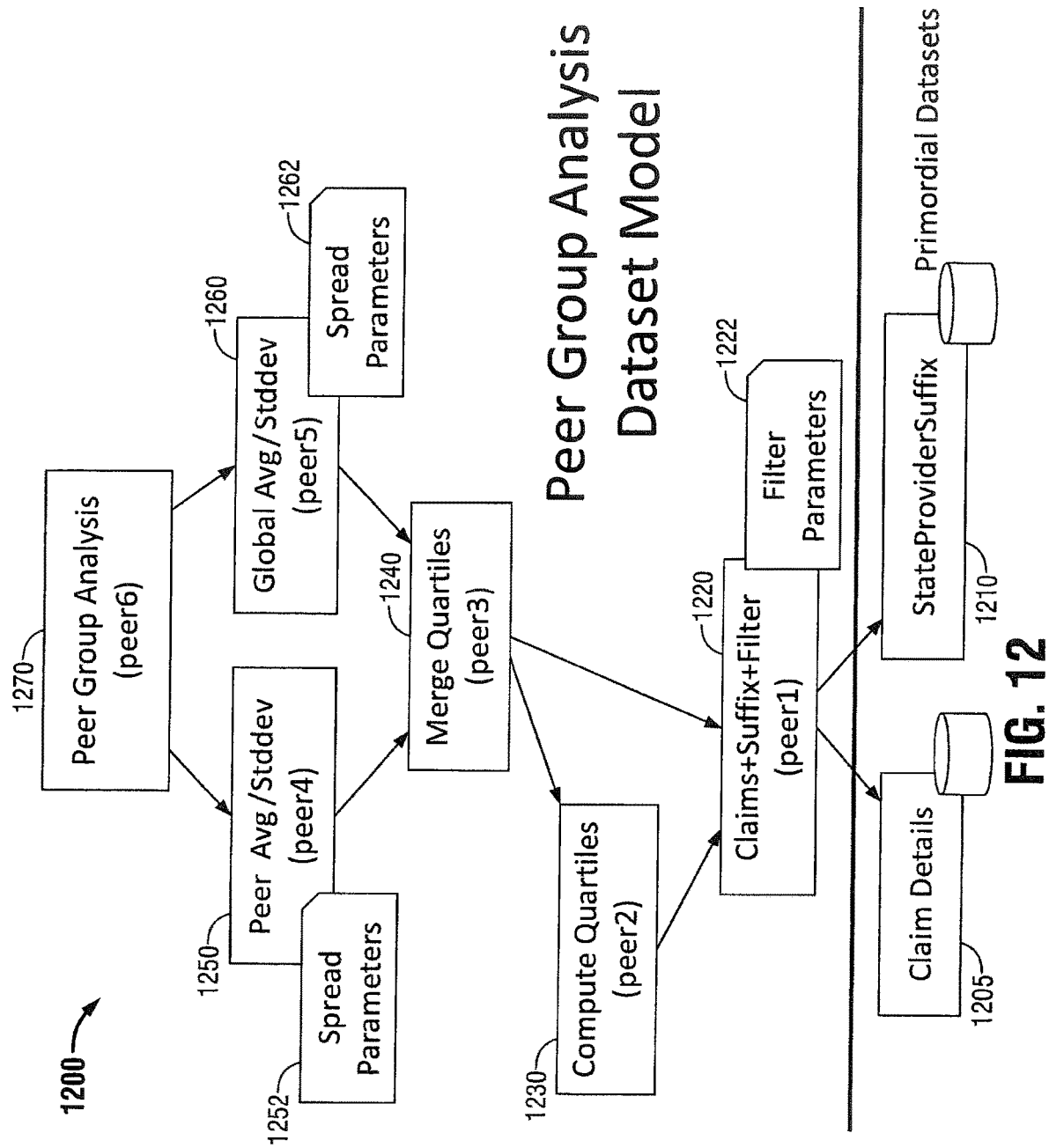
FIG. 12 depicts an exemplary hierarchy of dataset models relating to peer group analysis.

FIG. 12 depicts an exemplary hierarchy 1200 of dataset models used in an exemplary method of peer group analysis relating to claims experience. The datastore includes primordial datasets 1205 (Claim Details) and 1210 (StateProviderSuffix).

Primordial datasets 1205 and 1210 are the parents of dataset model 1220 (peer1). Dataset model 1220 includes an analytic (the peer1 analytic) which is executed on primordial datasets 1205 and 1210. The peer1 analytic uses filter parameters 1222, an example of which might be "location." Thus, an exemplary peer1 analytic might select all claims by providers located in Houston.

Hierarchy 1200 also includes dataset model 1230, which has dataset 1220 as a parent, and dataset model 1240, which has datasets 1220 and 1230 as parents. Dataset 1250 has dataset 1240 as a parent, and includes parameters 1252. An exemplary analytic (peer4) for dataset 1250 would include computation of peer average and standard deviation for each peer in the peer group, and an exemplary parameter 1252 would be the number of standard deviations. Dataset 1260 has dataset 1240 as a parent, and includes parameters 1262. An exemplary analytic (peer5) for dataset 1260 would include computation of global average and standard deviation, and an exemplary parameter 1262 would be the number of standard deviations. Dataset 1270 computes the desired peer group analysis based on data in parent datasets 1250 and 1260.

Figure 13:
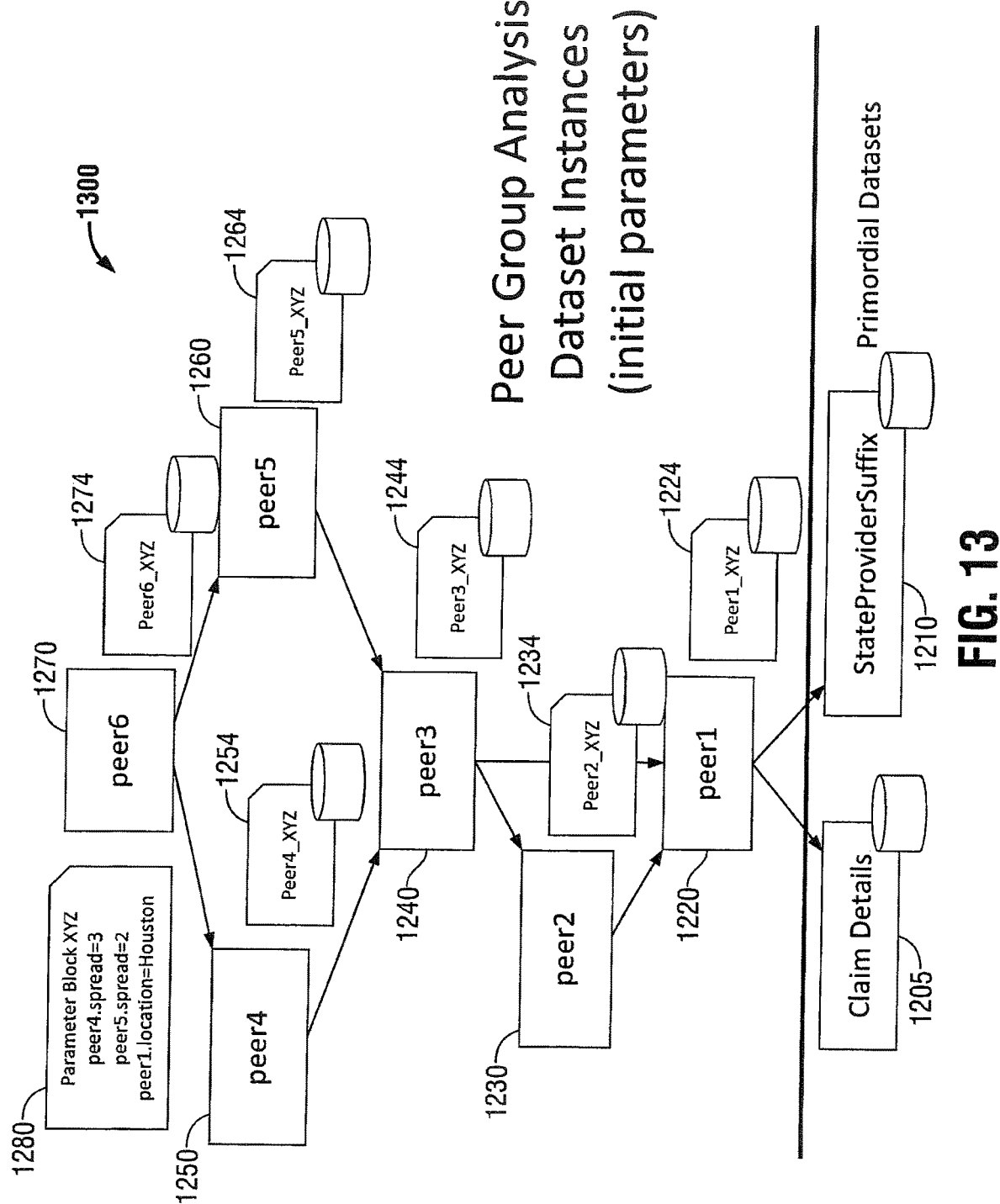
FIG. 13 depicts exemplary dataset instances relating to peer group analysis.

FIG. 13 depicts a hierarchy 1300 of exemplary dataset instances computed from the dataset models in hierarchy 1200. The dataset instances are computed using parameter set 1280, which includes "Houston" as a parameter for the peer1 analytic in dataset model 1220, 3 standard deviations as a parameter for the peer4 analytic in dataset 1250, and 2 standard deviations as a parameter for the peer5 analytic in dataset model 1260. The HAS computes dataset instances 1224, 1234, 1244, 1254, 1264, and 1274 for each model.

Figure 14:
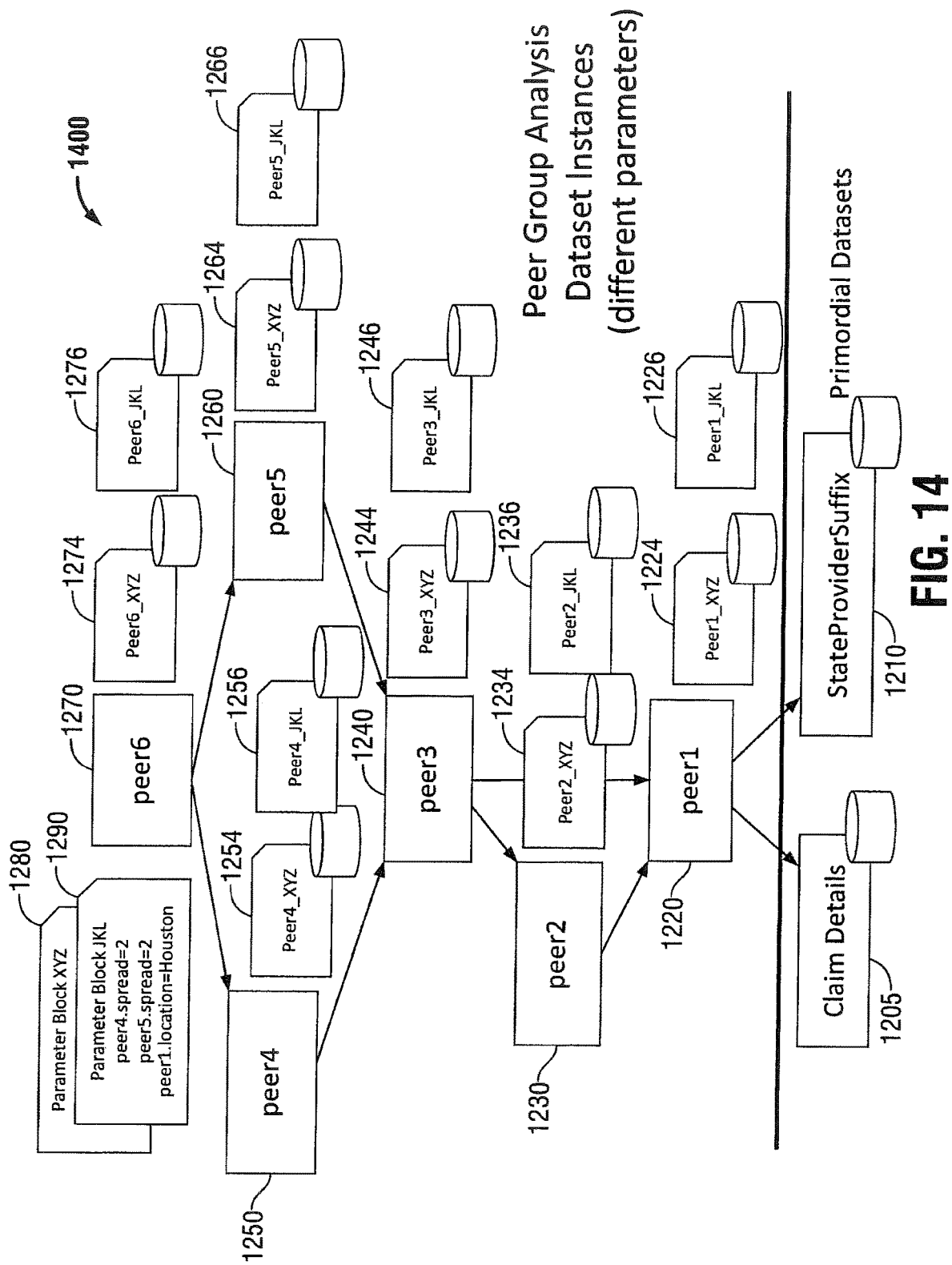
FIG. 14 depicts alternative exemplary dataset instances relating to peer group analysis.

FIG. 14 depicts an alternative hierarchy 1400 of exemplary dataset instances computed from the dataset models in hierarchy 1200 using different parameters. The dataset instances are computed using parameter set 1290, which includes "Houston" as a parameter for the peer1 analytic in dataset model 1220, 2 standard deviations as a parameter for the peer4 analytic in dataset 1250, and 2 standard deviations as a parameter for the peer5 analytic in dataset model 1260. The HAS in FIG. 14 has computed dataset instances 1226, 1236, 1246, 1256, 1266, and 1276 for each model. Because the parameters do not change for datasets 1220, 1230, and 1240, dataset instances 1224 and 1226 should contain the same data, as should dataset instances 1234 and 1236 and dataset instances 1244 and 1256. Dataset instances 1254 and 1256 may include different data, however, because the standard deviation input parameter for the peer 4 analytic in dataset 1250 has changed from 3 to 2.

The exemplary profile pages 200 and 600 shown in FIGS. 2 and 6 include several panels that display analytical results based on executing analytics on the data stored in the HAS. The methods and systems described herein handle the housekeeping chores of identifying when the underlying data store has changed and automatically re-executing each analytic that depends on the data store, including compound dependent analytics that require recalculation of multiple intermediate data sets. Thus the exemplary HAS and methods and systems described herein ensure that the analytical results provided to the user automatically and reproducibly reflect the most current state of data in the underlying data store.

As used herein, an Analytic refers to a set of one or more analytic functions that produce a dataset. The analytic functions that can be included in an analytic include, without limitation, any simple or complex function that can be performed on data, on collections of data, including data tables, on sets of data, and any function that can be performed on or in a DBMS. This includes arithmetic, mathematical, logical, Boolean, algebraic, matrix, set, DBMS, and graph functions, or any combination thereof. This description of analytic functions is not intended to be limiting but instead is intended to be co-extensive with the knowledge and experience of one of ordinary skill in the art.

The Dataset Type Hierarchy provides a robust repository of metadata that can be used for a variety of purposes. First, recall that the metadata is available both on the Dataset Type as a whole as well as for each attribute. Therefore embodiments can support functionalities such as:

(1) Intelligently distributing the work load of a Dataset Hierarchy (re)compute across a cluster using the metadata as an input to a work manager;

(2) Auto-invalidating a Dataset or Dataset Hierarchy based on metadata attribute constraints. For example, a metadata constraint can be used to require that the values in a column must conform to a normal distribution or else the offending Dataset Instance becomes invalid; this state would in turn cause dependent Dataset Instances to also become invalid.

(3) Presenting to users a Dataset Catalog indexed by Dataset Types and Fields to allow users to (a) find uses of a field in all Dataset Instances or Dataset Types, (b) find the Dataset Types or Dataset Instances that reference a particular Thing Type or instances of a Thing Type; (c) Investigate data quality forensics (Data Quality forensics) (i.e., why is this value wrong or where did the value come from?); and (d) perform data discovery and understanding (i.e., what Datasets do I have and what do they reference?).

Metrics

A metric is a dimensional measurement of a Primitive (i.e., in an embodiment, a Thing, Link, or Dataset). For example, a metric can be a simple filter/aggregate of a dataset. In some instances, the data displayed in the user interface (UI) is the value of a metric. In addition, metrics can be used as intermediate values in the computation of other metrics and in the creation of Datasets.

In an embodiment, metrics are defined by MetricTypes that include sufficient metadata for all consumers of the metrics to use them in an encapsulated way. In an embodiment, an instance of a metric applies to one instance of one type of Primitive (Thing, Link, Dataset) and has a numeric value, zero or more dimensions, and a name which must be unique across all other metrics in the system.

In an embodiment, a metric may have dimensional flexibility and/or support metric filtering. For example, a "total_paid" metric on a Provider Thing could have a time dimension (when the payment was recorded), and possibly a procedure code dimension (what service was provided), in addition to the actual metric value (amount paid). Including dimensions in the metric definition enables analytical exploration of metric values explicitly in the UI. Metric filtering uses a metric's dimensions as filters, such that the value of the metric changes depending on the values of the filters. Not all metrics have (or need) filters, although any dimension is a potential filter.

Figure 15:
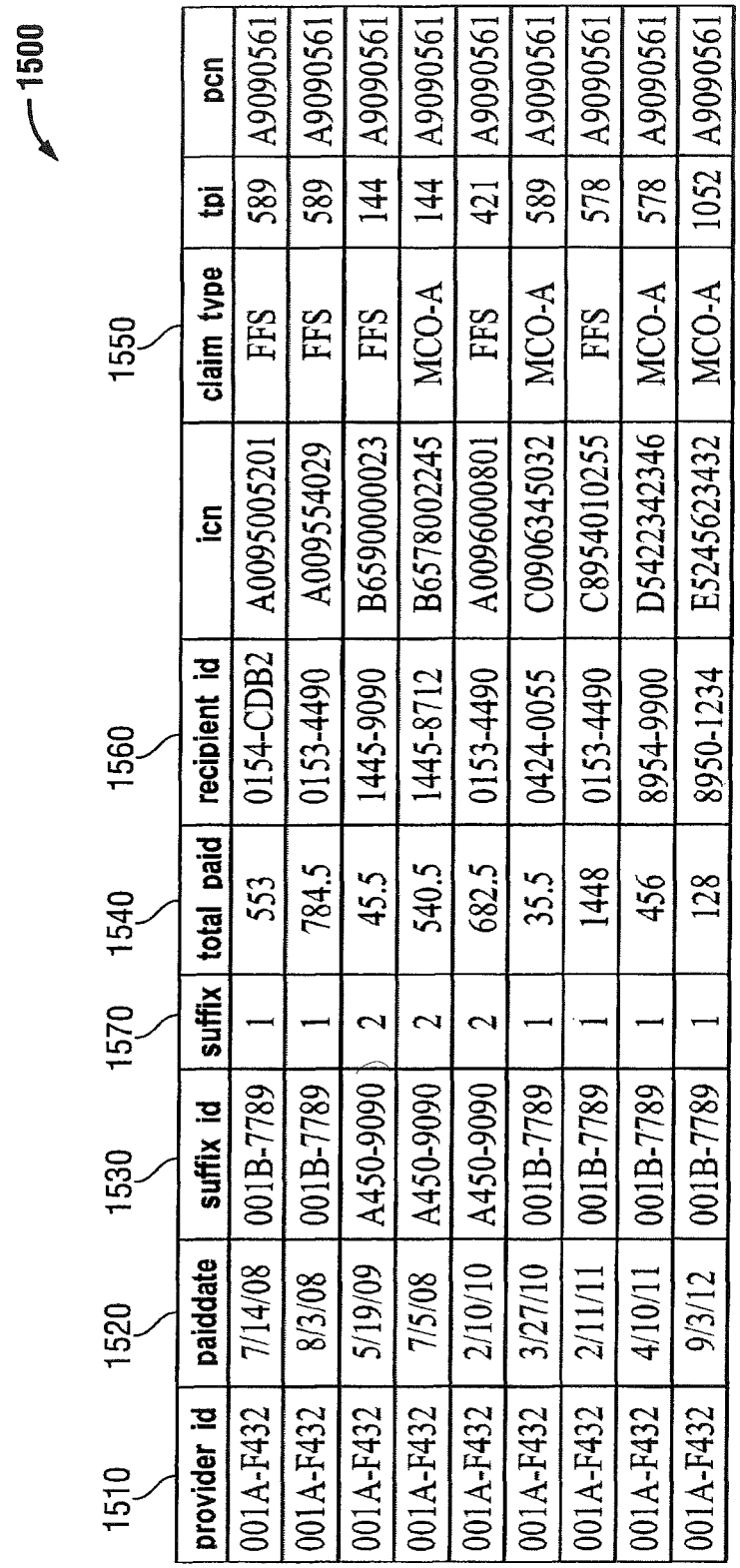
FIG. 15 depicts an exemplary dataset instance.

Presented below are examples of the value of dimensions in a metric. FIG. 15 shows an exemplary dataset instance 1500 of dataset model DST_ClaimHeader for claims relating to provider_id 001A-F432. The column headings identify the fields (metadata) of data in the dataset, including fields 1510 (provider_id), 1520 (paiddate), 1530 (suffix_id), 1540 (total_paid), 1550 (claim_type), 1560 (recipient_id), and 1570 (suffix). Here are some questions that can be asked of this data with examples of how metrics with and without dimensions help answer the questions.

To determine the total amount of claims paid (Total Paid), aggregate the entire total_paid column 1540 with 'sum' to get $4,673.50. To determine the average amount of paid claims (Average Paid), aggregate the entire total_paid column 1540 with 'average' to get $512.28.

To determine the total amount of all claims paid in 2009-2010 (Total Paid In 2009-2010), filter by paidDate column 1520 to get $763.50.

Some questions can be answered using claim_type 1550 as a dimension. To determine the total amount of claims paid for each claim type (Total Paid by Claim Type), pivot by claim_type 1550 and aggregate with 'sum' to get $3,513.50 paid on FFS claims and $1,160.00 paid on MCO-A claims.

Different questions can be answered using paidDate 1520 as a dimension. To determine Total Paid by Year for each from 2008-2012, pivot by paidDate 1520 with year granularity and aggregate with 'sum' to get $1,878 paid in 2008, $45.50 paid in 2009, $718 paid in 2010, $1,904 paid in 2011, and $128 paid in 2012. To determine the total number of claims paid each year from 2008-2012 (Total Claims By Year), pivot by paidDate 1520 with year granularity and aggregate with 'count' to get three claims paid in 2008, one in 2009, two in 2010, two in 2011, and one in 2012. To determine the average amount paid per claim per year (Average Paid Per Claim Per Year), pivot by paidDate 1520 with year granularity and aggregate with 'avg' to get $626 for 2008, $45.50 for 2009, $144 for 2010, $952 for 2011, and $128 for 2012.

Other questions can be answered using suffix 1570 as the dimension. To determine the total amount of claims paid by suffix (Total Paid by Suffix), pivot by suffix 1570 and aggregate with 'sum' to get $3,450.00 for suffix 01 and $1,223.00 for suffix 02. And to determine the total number of claims paid by suffix (Total Claims By Suffix), pivot by suffix 1570 and aggregate with 'count' to get six claims paid for suffix 01 and 3 claims paid for suffix 02.

With dimensions, filters and other controls (for example, controls that connect column data to visualization options), and the ability to do basic charting (multi-series line, bar and column), a significant amount of analytical insight can be derived from this very simple table. The ability to select rows (filter) based on the value of a dimension, to break the resulting rows into multiple series (pivot) based on the value of a dimension, and to aggregate using a discrete set of basic aggregation methods (in an embodiment, sum, avg (average), min (minimum), max (maximum), and count) is useful analytic fare for a micro view of the data. Other aggregation methods may be used and the scope of the invention is not limited to the aggregation methods described herein.

A metric can be the mathematical product of two different aggregates. For example, from the values of the metric total_paid, an aggregate of the total dollar value of all claims paid to a provider, and metric total_count, an aggregate of the number of such claims, a metric can provide the Average Paid per Claim equals total_paid/total_count.

An embodiment uses a limited number of mathematical operations, including addition, subtraction, multiplication, and division with two aggregates plus constants. The formula will be specified as a valid expression for the underlying storage engine (e.g., if in an embodiment the storage engine is a SQL database, the formula will be specified as a valid SQL numeric expression) and captured as a configuration property of the definition of the metric.

Metric Definition

In an embodiment, a metric is defined over a particular dataset model and in terms of the fields and other metadata in the dataset model, and therefore a metric defined over a particular dataset model will consistently perform the same way across each instance of the dataset model (including new instances created after the metric is defined) without any changes to the definition of the metric.

FIG. 16 depicts an exemplary definition 1600 for a metric titled "provider_payment." Exemplary definition 1600 comprises exemplary attribute:value pairs expressed in JSON notation.

Exemplary metric attribute name 1610 is the name, or key value, of the metric. In this example the name of the metric is "provider_payment."

Exemplary metric attribute dataset 1615 is the dataset model (or template) on which the metric is defined. In this example, the metric "provider_payment" is defined over dataset model DST_ClaimHeader. (Dataset instance 1500 in FIG. 15 is an exemplary instance of dataset type DST_ClaimHeader.)

In an embodiment each metric is tied to an existing Thing. Exemplary metric attribute targetType 1620 identifies the type of Thing to which the metric is tied. In this example, the provider_payment metric is tied to a "provider" Thing. The value of the Thing preferably is used as a first-level pivot for the metric.

Exemplary metric attribute targetIdField 1625 identifies the dataset field that references the targetType.

Exemplary metric attribute valueField 1630 identifies the value of the metric.

Exemplary metric attribute valueType 1635 describes the type of the valueField. Exemplary valueTypes include number and date. If the underlying storage engine is an SQL database, the valueType preferably matches the SQL type of the valueField.

Exemplary metric attribute defaultValueAggregate 1640 defines the aggregation method for the metric, which in this example is sum. Other aggregator functions in an embodiment include min (minimum), max (maximum), avg (average), and count.

Exemplary metric attribute distinct 1645 determines use of the SQL DISTINCT function. In this example the value is "true," which means that duplicate values will be ignored in count value statistics.

Exemplary metric attribute coalesce 1650 determines use of the SQL COALESCE function. In this example the value is "true," which means that empty (or null) values will be forced to zero in the computation of algebraic statistics.

Exemplary metric attribute filter 1655 defines an exemplary filter value based on a fieldName, a value, and a comparator. In this example, the metric "provider_payment" operates only on entries which the value in the fieldName "statuscode" is equal to (EQ) "P," meaning claims that have been paid.

Exemplary definition 1600 of the metric "provider_payment" defines several dimensions 1660.

Exemplary dimension 1670 uses the paiddate field as the dimension. The dimensionType attribute describes the type of attribute, which in this case is a time attribute. In an embodiment a time attribute includes a granularity attribute "timeGranularity" of month, day, or year, and the timeGranularity value for this dimension is "month." In an embodiment, another dimension could be defined on the same field with different granularity to enable display of the metric pivoted by time at a different granularity.

Exemplary dimension 1680 uses the claim_type field as the dimension. The DimensionField attribute is "claim_type"; and the dimensionType attribute describes the type of attribute, which in this case is a "category." Exemplary dimension 1690 uses the suffix field as the dimension. The DimensionField attribute is "suffix"; and the dimensionType attribute describes the type of attribute, which in this case is a "category."

In an embodiment, the metric definition constrains the possible functions available on the metric. A metric with no dimensions cannot have a TopN transformation as there is no value to pivot on. A metric with only a date-valued dimension also cannot have a topN form because a date will not enumerate to a limited range.

In embodiments, a Metrics Service may be used to return metric values for the defined metric. The Metrics Service preferably provides different methods and/or different method signatures to compute metrics of varying complexity (for example, filter, pivot, time range, topN). The Metrics Service evaluates the method and method signature and, using the instructions and data source defined in the definition of the metric, provides the instructions necessary to compute the metric. Preferably the Metrics Services provides instructions operable by the storage engine. If the storage engine is an SQL database, the Metrics Service generates a fragment of SQL code that can be combined with other SQL code into a well-formed SQL query.

FIG. 17 lists exemplary metric functions of an exemplary Metrics Service 1700.

Function 1710 getMetric(id, key) takes as arguments the identifier ("id") of a Thing and the name of the metric ("key") and returns a scalar number value (a number or a date) resulting from the defined performance of the metric.

Function 1720 getMetric(id, key, aggregate) takes as arguments the identifier of a Thing, the name of the metric, and an aggregation method (sum, avg, min, max, and count), and returns a scalar number value. For example, using the definition of 1600 of the metric provider_payment, this expression can be used to obtain the total of all payments to provider 001A-F432: getMetric("001A-F432", "provider_payment", "sum").

Examples: The getMetric expression getMetric("001A-F432", "provider_payment", "sum") generates this SQL fragment: SUM(total_paid). The getMetric expression getMetric("001A-F432", "provider_payment", "avg") generates this SQL fragment: AVG(total_paid).

Function 1730 getMetric(id, key, aggregate, Filter[ ]) takes as arguments the identifier of a Thing, the name of the metric, an aggregation method, and filter parameters (field, value, and comparator), and returns a scalar number value.

Function 1740 getMetric(id, key, aggregate, Filter[ ], timerange) takes as arguments the identifier of a Thing, the name of the metric, an aggregation method, filter parameters, and a timerange, and returns a scalar number value.

Example: The getMetric expression getMetric("001A-F432", "provider_payment", "sum", null, {2009, 2013}) generates this SQL fragment: SUM(total_paid) WHERE paiddate>=2009 AND paiddate<2013.

Function 1750 getMetricSeries(id, key, aggregate, pivot[ ], Filter[ ], timerange, topN) takes as arguments the identifier of a Thing, the name of the metric, an aggregation method, pivot parameters (pivot[ ]), filter parameters, a timerange, and (optionally) a topN value, and returns a series of N numbers. For example, using the definition of 1600 of the metric provider_payment, this this expression can be used to obtain payment activity between 2005-2015 for provider 001A-F432: getMetricSeries("001A-F432", "provider_payment", "sum", ["paiddate" ], null, {2005, 2014}). TopN and bottomN metrics are a specialization of a normal metric with a dimension used as a pivot, and the results limited to the top 'N' of the sorted values. This abstraction allows retrieval of topN and bottomN metrics from the same dataset, and N can be specified at metric retrieval time.

Example: The getMetric expression getMetricSeries("001A-F432", "provider_payment", "sum", ["claim_type" ], null, {2009, 2013}, -1) generates this SQL fragment: claim_type, SUM(total_paid) WHERE paiddate>=2009 AND paiddate<2013 GROUP BY claim_type.

Example: The getMetric expression getMetricSeries("provider_payment", "sum", ["claim_type" ], null, {2009, 2013}, 5) generates this SQL fragment: claim_type, SUM(total_paid) as value WHERE paiddate>=2009 AND paiddate<2013 GROUP BY claim_type order by claim_type limit 5.

Example: The getMetric expression getMetricSeries("001A-F432", "provider_payment", "sum", ["claim_type", "paiddate" ], null, {2009, 2013}, -1) generates SQL fragment: claim_type, date(trunc(paiddate, 'MONTH')), SUM(total_paid) WHERE paiddate>=2009 AND paiddate<2013 GROUP BY claim_type, trunc(paiddate, 'MONTH') order by trunc(paiddate, 'MONTH'. This last request returns a 2-series time series, with the series corresponding to claim types.

In an embodiment there is no upper limit to the number of dimensions on a metric, and no cost in having them, although pivots by some high-distinct-value dimensions is going to be slow. In embodiments there may be a practical limit of 2 pivots, or 3 if one pivot is a time-valued dimension. The general visualization of a metric with pivots is a (stacked) column chart, or a multi-series time series.

Function 1760 getMetricDimensionValue(key, aggregate, dimension) takes as arguments the name of the metric, an aggregation method, and a dimension and returns a string. For example, using the definition of 1600 of the metric provider_payment, this expression could be used to obtain the month of the first payment to the provider, getMetricDimension("provider_payment", "min", "paiddate"), and this expression returns the month of the most recent payment to the provider, getMetricDimension("provider_payment", "max", "paiddate").

Function 1770 getMetricDimensionValues(key, dimension) takes as arguments the name of the metric and a dimension and returns a list of strings, for example, using the definition of 1600 of the metric provider_payment, a list of claim types or suffixes.

Function 1780 getMetricDimensionSelectionValues(key, dimension) takes as arguments the name of the metric and a dimension and returns a Map of Strings and Strings. To pivot on a dimension, this function takes the data and splits it into multiple series with each series corresponding to one unique value of the pivoted dimension. This function returns all of the unique values of the dimension. In FIG. 15, for example, item 1550 (claim_type) can be a dimension. If this function is called on dimension claim_type (1550), the strings "FFS" and "MCO-A" would be returned.

Preferably, several metrics can be requested at the same time. For example: getMetric("001A-F432", key, "min"), getMetric("001A-F432", key, "max") could both come from a single SQL call (if the data is not already cached). So the Metrics Service preferably will allow a single metric, multiple metrics, or a set of metrics to be fetched in a single call to the storage engine.

In an embodiment, the Metrics Service getMetric( ) methods could be called by the user interface, for example, to compute a metric at run time, and by embodiments of the HAS, for example, to precompute metric values.

Figure 18A:
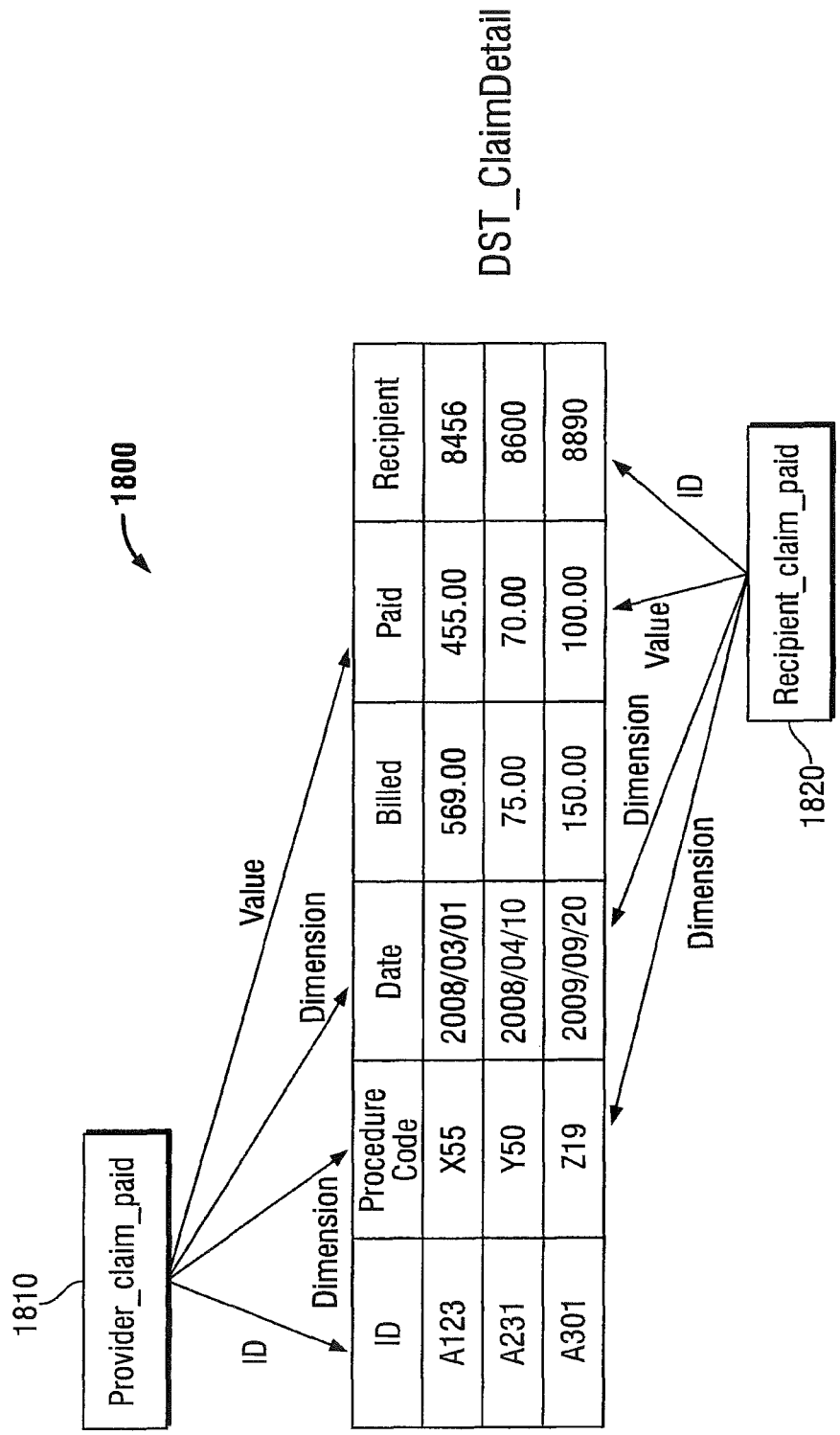
FIGS. 18A and 18B depict exemplary metrics on an dataset.
Figure 18B:
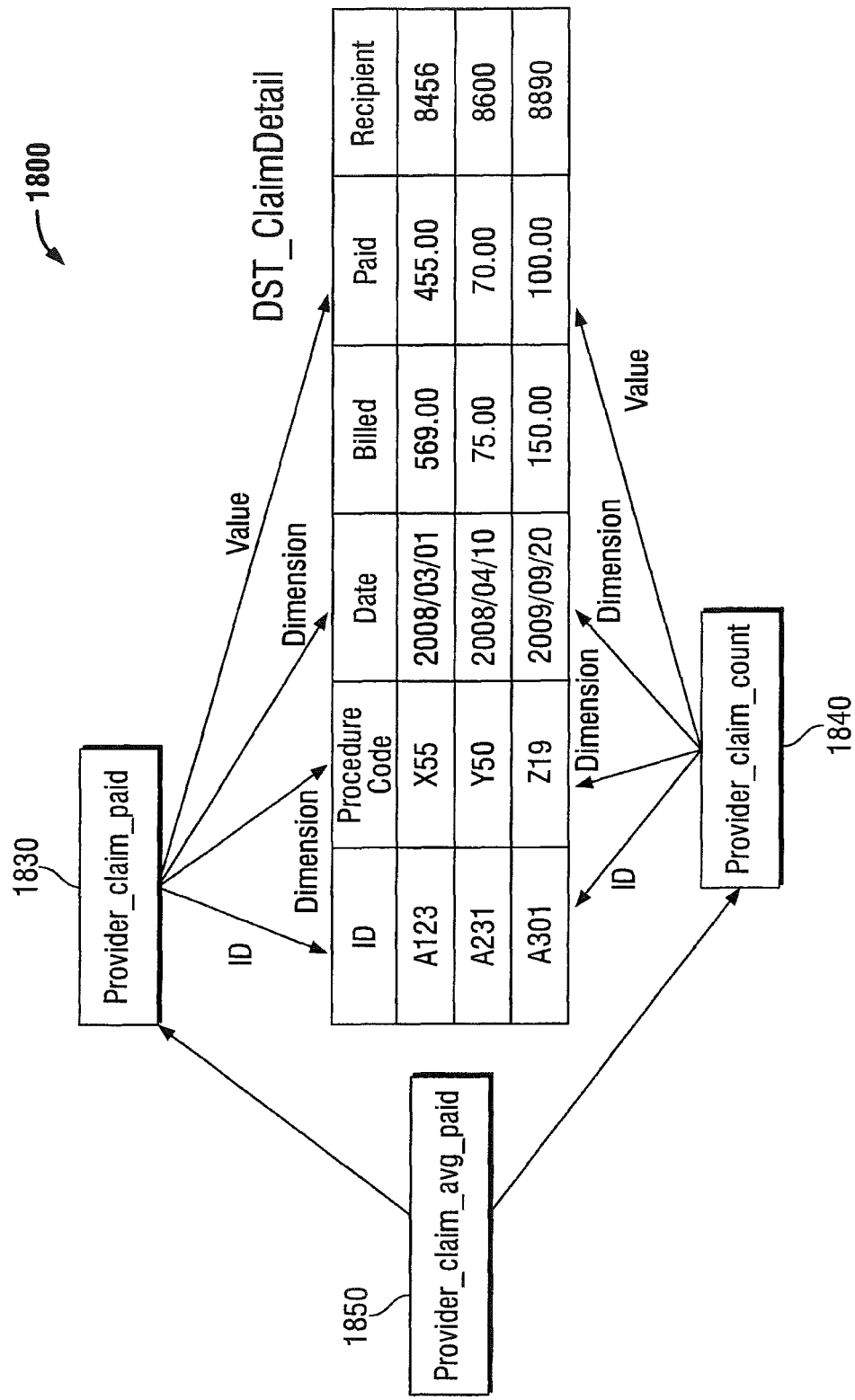

FIGS. 18A and 18B illustrate different metrics on an exemplary instance of a dataset 1800 DST_ClaimDetail. FIG. 18A depicts metric 1810 for providers and metric 1820 for recipients. Each metric has two dimensions, procedure code and date. With these metric definitions, assuming the statistic on the value field is 'sum', the metrics can answer questions about total paid to a provider over all time, with a specific time window, monthly over time, monthly over time per procedure code. Without a pivot or filter, the value of the metric is the total paid over all time for all procedure codes.

A metric value can be defined as a product of other metrics when, preferably, the metrics share the same base dataset, and have the same dimensions. FIG. 18B shows three metrics defined over the same dataset 1800 (DST_ClaimDetail): Metric 1830 (provider_claim_paid) uses aggregation 'sum' on the value field; metric 1840 (provider_claim_count) uses aggregation 'count' on the value field; and metric 1859 (provider_claim_avg_paid) uses the values of the underlying metrics with the formula 'provider_claim_paid/provider_claim_count' to produce its value. With this construction, all of the same dimensions, pivots and filters apply, and the same questions can be asked about any of the three metrics.

Metric Consumption

Metrics preferably are consumed in an embodiment in the construction of datasets and via the User Interface.

A metric value can be (and typically is) derived from a dataset. In some embodiments, different instructions for computing the various values via the storage engine embodiment require a large number of variations of an archetypal (or parametric) structure as shown in the SQL Pattern 2000. Additionally, the underlying Dataset Types that Metric definitions rely on could also change. What emerges is a code proliferation and management problem. The ability to define a metric, as described herein, provides several distinct and significant advantages. First, the definition of a metric can generate the storage engine instructions to compute the metric values as well as detect incompatibilities between the dataset type and metric definition. Second, it can also serve as the instructions to supply values to a Column of a different Dataset Type by enabling a Dataset Type to simply reference the metric to supply the values and the platform will also generate this code. Lastly, the Metric Definition can also serve to enable intelligent caching of the metric values.

The ability to re-use metrics provides other significant benefits. For one, it reduces the complexity of the command of a dataset. The command only has to be responsible for producing a subset of the fields the dataset produces, with the HAS platform responsible for populating the metric values. Also, the logic used to compute a metric is located in a single place, so that when definition or logic used to compute the metric is revised, it only needs to be revised once. In an embodiment, when a dataset 'references' a metric, it is implicitly adding the dataset from which the metric is computed as a another parent dataset, so dataset hierarchies and invalidation inform the platform what and when to re-compute. Plus, the addition of dimensions to a metric definition enables the UI to provide a much richer set of visualizations, while still reducing the metric to a single tile in a profile.

In an embodiment, a scalar metric can be referenced in a dataset by 'joining' the metric to the dataset as a new column. Preferably the dataset has a column of Thing IDs for the same Thing ID in the definition of the metric.

The User Interface in an embodiment can display metric values in two places—in a profile page and in a dataset viewer. The exemplary profile page 200 (FIG. 2), for example, includes panels that display metric values relating to the Provider Thing identified as James Sabourin, including the specific data displayed in panels 220 and 245 (provider's claims history), 230 and 240 (top five procedures by amount and top five diagnoses by count), and 250 (the total of all claims paid). Other panels display the results of metrics on Links to other Things, including panels 210 (the number of open cases associated with the provider), 215 (the number of other Providers with Case Histories to which James Sabourin is connected or Linked), and 260 (the locations (or suffixes) associated with the provider).

Figure 19:
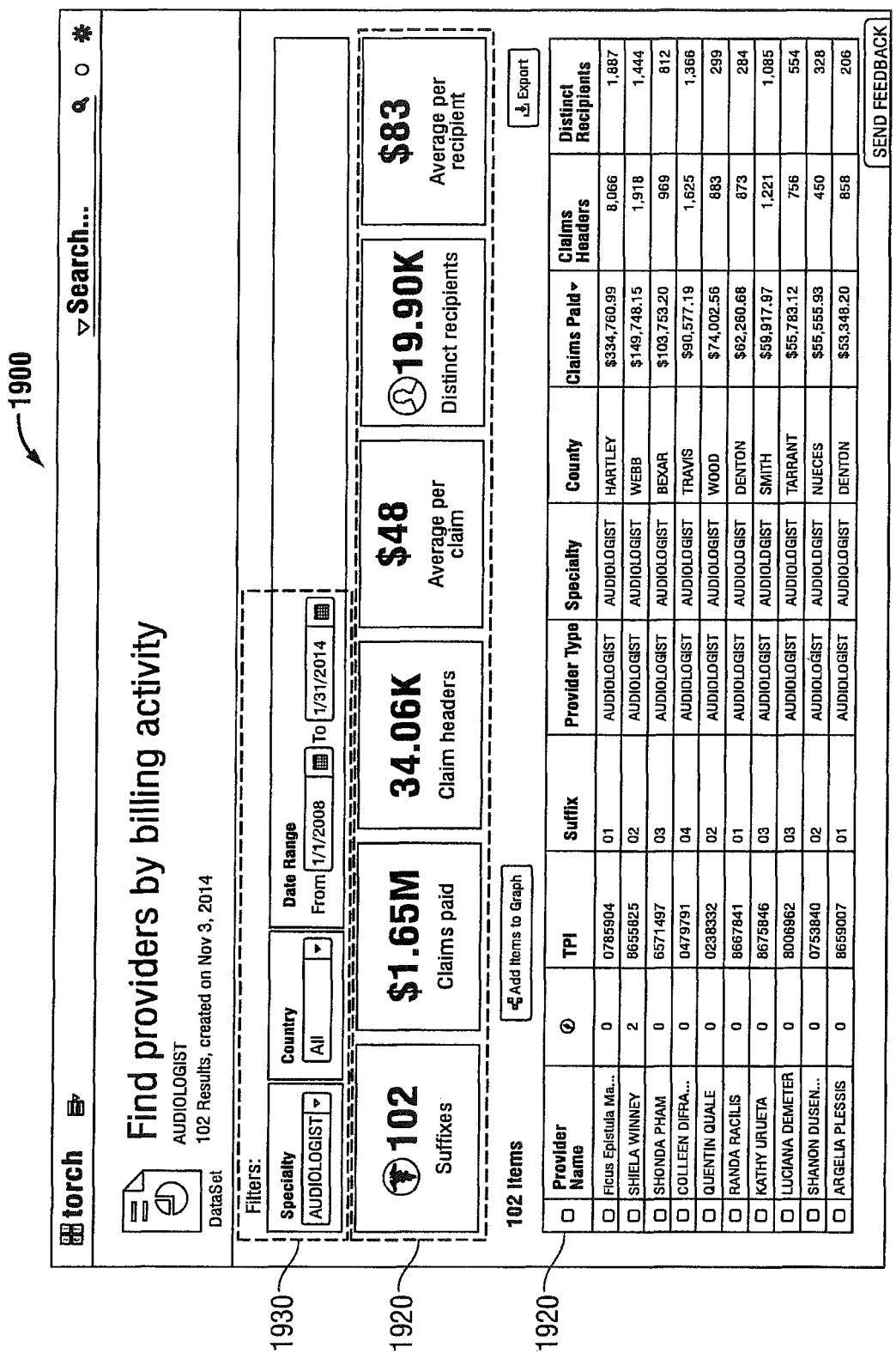
FIG. 19 depicts an exemplary dataset view.

FIG. 19 depicts an exemplary dataset view 1900, including table 1910 of dataset values, metric values 1920, and controls 1930. Controls 1930 include filters 1932 (Specialty), 1934 (County), and 1936 (Date of Service). Because the dataset viewer allows the dataset to be filtered, the metric values displayed in the viewer may change in response to the filters changing. As the user changes the filter parameters, the values of the metrics that support the filter and the displayed rows may change. If a metric does not support the filter, those metric values will not change when the user changes the filter parameters. In an embodiment, the filter values in Controls 1930 need to flow into the filterWhereClause in SQL pattern 2000 shown in FIG. 20. In this example, there are no dimensions on these metrics and the groupByClause, orderClause and limitClause elements of SQL pattern 2000 are all null. So the dataset metric definitions simply need to produce the fields (and potentially add to metricWhereClause).

When the User Interface displays the dataset in a dataset viewer (which may display the data in a table as shown in FIG. 19, or in a number of chart forms), the filters can be thought of as the intersection of the dimensions of the dataset metrics, and the Metrics Service can populate the possible values for each filter. The number of possible values could dictate the control type used by the filter, or the dimension could have an attribute indicating the desired control type. So the User Interface could construct the filters above using nothing but metadata about the dataset metrics plus a call to the Metrics Service for each dimensional filter to determine its range. In an embodiment, the left-to-right order of the filters can be specified in the definition of the metric.

The User Interface can also display the metric values 1920 knowing nothing but the metrics associated with the dataset. The dataset viewer can be totally generic, driven by only metric metadata for the metrics associated with the dataset type to be displayed. In an embodiment, the left-to-right ordering of the metrics can be specified in the definition of the display page.

Preferably the User Interface also includes a general dimensional viewer to allow the user to filter/pivot the data behind a metric into different chart formats (for example, multi-series line, bar and column). In an embodiment, a small icon is displayed up in the lower-left corner of the metric box, selection of which exposes the dataset behind the metric to allow analytical exploration of the 'raw' data. If the metric has dimensions, the viewer in an embodiment may include a different/additional icon that indicates that clicking on the metric will display a pivot charting visualization. Compared to a conventional spreadsheet application, metrics provide an improved way to chart data. Charting in a conventional spreadsheet application is easy when you have the columns you need, contiguous, and in the order that the application expects them for charting. Use of metrics reduces the need for such reformatting.

Metric Production

Metrics preferably can be added or revised dynamically. If an analyst has articulated a new measure of a specific Thing, and the data necessary to make the measurement is available in an existing dataset, the analyst wants that new metric to show up on the profile page for the specific Thing without having to reload the system.

Because embodiments of a hierarchical analytical system may include hundreds or even thousands of defined metrics, it is desirable to assign each metric a unique key value (name) so that two metrics with different implementation do not accidentally collide.

The analyst would like to be able to revise a metric without reloading the system or having to manually fix every instance of the metric. For example, a Dataset written in SQL may compute a metric value for each record added to the Dataset. If that same metric is repeated in multiple Dataset SQL commands, the analyst would prefer to avoid having to search, find, and repair each 'copy' of the metric SQL whenever the definition of that metric changes. In an embodiment, the Dataset SQL 'references' the metric, and the platform handles the details of getting the value in the right place. Thus when a metric definition changes, the HAS identifies (preferably via the metric reference in the dataset) which Datasets are affected, and invalidates existing instances of those datasets and re-computes them.

After a new metric has been produced, or an existing metric has been modified, it can be pre-computed and cached at any time.

In an embodiment, production of a metric type can be done using a text editor. In another embodiment, the User Interface can include a Metric Authoring Tool to author/edit/test definition of a metric type.

Referring to the exemplary dataset 1500 DST_ClaimHeader in FIG. 15, here is an example of a method for defining a metric Type for a new metric (newMetric). First, the dataset definition fields will designate what types of Things are present in this dataset. NewMetric preferably will be for one of those types, unless it is a metric on the dataset itself. So the possible Thing types is constrained—in this case Provider or Recipient. Once the type is chosen, the column for the type is known (unless the dataset has multiple columns for the same type). Next the creator must choose a name, which preferably will be unique, fairly short, and limited to the characters in [a-z0-9-]. Preferably there will be a description that tells consumers of this metric what it really means. The value field preferably is numeric so the candidate dataset fields are constrained to suffix or total_paid. The selection of dimensions is determined by how the creator want to explore this metric. Any dataset field not already chosen is a candidate, with date/time fields being good candidates, as are fields that have a limited number of distinct values. If provider_id was the thing field, recipient_id doesn't make much sense as a dimension, because there are so many distinct values. Claim_type is a simpler dimension, as is suffix. ICN is not. Knowing the number of distinct values in a column is helpful in choosing dimensions, which means the editor would benefit from having a dataset instance (in addition to the dataset type) during metric construction. After the dimensions have been selected, all that is left is to choose the default aggregation.

If the ID of the metric is the dataset itself (instead of a REFERENCE field in the dataset) then the metric is applied to the dataset when viewed in the dataset viewer. If the ID of the metric is a REFERENCE field in the dataset, then the metric applies to the type of the REFERENCE field.

In an embodiment, changing the definition of a dataset template (for example, changing a field name) will automatically update all metrics associated with the dataset. By breaking a metric into a data structure rather than a formulaic expression, the dataset editing tools and metrics are aware of each other, such that a change in one that affects the other could be resolved automatically.

Metric Validation

Static validation of a metric in an embodiment comprises checking that the dataset has a definition, and that the type field and all dimension fields exist in the source dataset. If a dimension is marked as a time dimension, the dataset field should be a DATE/TIME type field. The value field should be numeric unless the aggregation is count (in which case no value field is required). A metric expressed as a scalar value has no logic that requires validation. A metric with Pivots and Filters result in some SQL logic, but it is machine generated SQL and can be independently validated with unit tests.

Metric Retrieval, Storage, and Caching

While scalar metric values are typically the ones used in the profile pages (and preferably are available at low latency), there are some metrics in the profile pages that have pivots—specifically payments by time. Since it is hard to predict which profile pages will be viewed in advance, pre-computation and caching of metrics that are known to be in profile pages to avoid querying the storage engine for the data will improve performance.

Because, in an embodiment, all metric values come from Dataset instances, the MetricType object (in conjunction with the DatasetType) can be used to generate SQL to fetch metric values from the Dataset Instance table. For some metrics that might be slow, either due to complex SQL (unlikely) or large tables (very likely). If populating a profile page requires 15 metrics, that's a significant load on the DBMS for each page load, and preferably Profile pages should load fast. Performance benefits can be achieved by caching, or possibly even precomputing (and then caching) some metrics. And since a metric value comes from a dataset, and the dataset may be invalidated, invalidating a dataset needs to invalidate the metrics cache, which may involve re-computing (and caching) the changed metric values.

In an embodiment, all metrics are pre-computed, grouped by Thing ID, and all metrics for a given Thing ID are stored in Elastic Search as a JSON document. So fetching any metric for any Thing gets all metrics for that Thing in, preferably, a single Elastic Search call, which improves the speed of loading profile pages. To allow for an efficient cache miss, the Metrics Service preferably will handle read/write from the cache (thus ensuring the Metrics Service can know what is missing), fetch just the missing parts and cache them, and return everything requested as efficiently as possible.

Here are some examples of exemplary cache files containing pre-computed metric values. The following examples use the metric "provider_payment," which is defined in metric definition 1600 (FIG. 16). The dataset template is DST_Claimheader_data, defined in dataset template 2100 in FIG. 21. The data in the dataset instance of DST_Claimheader_data is the data shown in dataset instance 1500 (FIG. 15).

Example 1 (FIGS. 22A and 22B): The exemplary expression

GetMetric{id='001A-F432', key='provider_payment', aggregationMethod=SUM, pivots=[claim_type]} will generate (preferably via the Metrics Service) the SQL expression 2210 shown in FIG. 22A and will store document 2200 (FIG. 22B) in Elastic Search. Document 2200, shown in FIG. 22B, includes "dimensions" attribute 2220, which identifies the pivot field for the metric. The value of the "metric_id" attribute 2230 is the unique document id, or key, of document 2200 in Elastic Search. The "metrics" attribute 2235 identifies the metric (provider_payment). The "key"

attribute 2240 provides a unique identifier for this metric value which, in an embodiment, includes the name of the metric and a hash value computed on pivot dimension. Attribute "series" 2250 includes the pre-computed metric values 2252 and 2256 which in this example are the sum ($1160.00) of all MCO-A claims paid (2252) and the sum ($3,513.50) of all FFS claims paid (2256). Attribute "source" 2260 and "source_type" 2270 identify the Thing type (provider) and specific Thing (provider 001A-F432), to which these metric values are tied.

Example 2 (FIGS. 23A and 23B): The exemplary expression

GetDimensionalMetricOperation{targetScope='target_scope',
id='001A-F432', key='provider_payment',
aggregationMethod=SUM, pivots=[claim_type, suffix]} will generate (preferably via the Metrics Service) the SQL expression 2310 shown in FIG. 23A and will store document 2300 (FIG. 23B) in Elastic Search. Document 2300, shown in FIG. 23B, includes "dimensions" attribute 2320, which identifies the pivot fields for the metric, "claim_type" and "suffix." The value of the "metric_id" attribute 2330 is the unique document id, or key, of document 2300 in Elastic Search. The "metrics" attribute 2335 identifies the metric (provider_payment). The "key" attribute 2340 provides a unique identifier for this metric value which, in an embodiment, includes the name of the metric and a hash value computed on the pivot dimensions. Attribute "series" 2350 includes the pre-computed metric values 2352, 2354, 2356, and 2358 which in this example are the sum ($728) of all FFS claims paid to suffix 02 (2352), the sum ($2,785.50) of all FFS claims paid to suffix 01 (2354), the sum ($540.50) of all MCO-A claims paid to suffix 02 (2356), and the sum ($619.50) of all MCO-A claims paid to suffix 01 (2358). Attribute "source" 2360 and "source_type" 2370 identify the Thing type (provider) and specific Thing (provider 001A-F432), to which these metric values are tied.

In an embodiment, the HAS inspects the user interface configuration data to identify what metric keys (and dimensions) are required by the interface and pre-computes those specific metrics (and dimensions). For static construction (e.g. the user interface will show metric X pivoted by dimension Y in a specific location of the page), the HAS preferably pre-computes all metric values. For dynamic construction (e.g. the user interface allows the user to choose a pivot at runtime) the HAS can compute the values on the fly.

Since the vast majority of the instances of a type will never have their profile page viewed, pre-computing and caching all referenced metrics for instances of profile-visible types can be inefficient. In an alternative embodiment, the scalar values are pre-computed into a type-specific table where the columns are metrics and the rows are instances of the type, and there is one such table per type. Then reading all scalar values for an instance means reading a single row and caching it, preferably in a space-bound LRU memcached type cache.

There may be a need to cache some metric values that have pivots. For example, the provider profile shows claims_paid with a time pivot, and procedure codes count/dollars paid with a code pivot and top-5 limit applied. If metric pre-computation can determine what metrics (and pivots) are referenced by the User Interface, then those values can be pre-computed and cached. The Metrics Service preferably monitors how many cache hits/misses there are, and some indication of what the misses are, to improve the performance and efficiency of the pre-computation and caching processes.

Multi-Metric Read for Dataset Metric

The Dataset Viewer in the User Interface displays zero or more metrics associated with the dataset. Since the Dataset Viewer can specify zero or more filters that the user can change to alter the rows of the dataset that are viewed, and these filters need to be applied to the metrics, Filtered Metrics can be used for dataset metrics. If there are multiple dataset metrics, dataset view performance is enhanced when some or all of the metrics can be realized with one SQL query. Referring to the canonical form of the metric query depicted in SQL pattern 2000 (FIG. 20), the fields from all metrics can be combined, in an embodiment, if (and only if) the other clauses do not conflict. An example of a conflicting clause would be a normal metric and a topN metric, or a scalar metric and a series metric.

A metric on a Link, in an embodiment, can be the measure of the Things at both ends of the Link, or it can be a sum of the measure of all Things transitively connected to the Link.

Those of skill will recognize that the methods, processes, and techniques of the embodiments described herein may be implemented to advantage in a variety of sequential orders and that embodiments may be generally implemented in a non-transitory physical medium, preferably magnetic or optical media such as RAM, RAM drives, USB drives, SD memory, disks, tapes, DVDs and CD-ROMs or other persistent storage media, for introduction into and/or use by a computer system described herein. In such cases, the physical medium will contain computer software or program instructions embedded in the media that, when executed by one or more processors, will execute the steps and perform the methods, processes, and techniques described herein of a Hierarchical Analytics System. Data and instructions for the operating systems, Java Virtual Machines, and applications or programs are located on persistent storage devices and may be loaded into memory media for execution by one or more processors. Java Applications may contain instructions that are loaded into memory media containing a Java Virtual Machine and executed by the Java Virtual Machine. The processes of the illustrative embodiments may be performed by processors using computer implemented instructions, which may be located in memory media.

While the invention has been particularly shown and described with reference to preferred embodiments, it will be understood by those skilled in the art that various changes in form and detail may be made therein without departing from the spirit and scope of the invention.

We claim:

1. A method of displaying current analytical results using a computer system comprising a processor and a memory media and coupled to persistent media comprising a data store, comprising:

defining a hierarchy of dataset models, including a first dataset model, each dataset model comprising a command, a data description, and identifiers for one or more parent datasets, wherein at least one dataset model has a parent dataset that is a primordial dataset which has no parents, wherein the first dataset model directly or indirectly descends from the primordial dataset, wherein the data store comprises the primordial dataset and the hierarchy of dataset models;

creating a first instance of the first dataset model by executing the command in the first dataset model on the data in valid instances of the one or more parent datasets of the first dataset model, wherein creating an instance of a dataset model comprises executing the command of the dataset model on the data in valid instances of the one or more parent datasets of the dataset model and storing in the data store the data produced by said executing the command, wherein executing the command comprises execution, by the processor, of computer instructions in the memory media;

displaying a first analytical result based on the first instance of the first dataset model;

when there is a change in data comprised in the primordial dataset, and in response to said change in data comprised in the primordial dataset, invalidating each instance of a dataset model that directly or indirectly descends from the primordial dataset, including invalidating the first instance of the first dataset model, wherein invalidating an instance of a dataset model comprises identifying the instance of the dataset model as invalid;

re-executing, for each invalid instance of a dataset model, the command in the corresponding dataset model on the data in the re-executed instances of the one or more parent datasets of the dataset model, including re-executing the command in the first dataset model on the data in the re-executed instances of the one or more parent datasets of the first dataset model to create a second instance of the first dataset model, and displaying a second analytical result based on the data comprised in the second instance of the first dataset model.

2. The method of claim 1, further comprising reproducing the first analytical result after the first instance of the first dataset model has been invalidated.

3. The method of claim 1, wherein the hierarchy of dataset models includes a second dataset model and the command in the second dataset model comprises a first parameter, and wherein creating an instance of the second dataset model comprises using a first value of the first parameter in executing the command in the second dataset model.

4. The method of claim 3, wherein the first dataset model descends directly or indirectly from the second dataset model, further comprising:

creating a new instance of the second dataset model using a second value of the first parameter in executing the command in the second dataset model;

for each dataset model that descends directly or indirectly from the second dataset model, re-executing the command in the corresponding dataset model on the data in valid instances of the one or more parent datasets of the dataset model, including creating a third instance of the first dataset model; and displaying a third analytical result based on the data comprised in the third instance of the first dataset model, which third analytical result shows the analytical results of changing the first parameter value.

5. The method of claim 4, further comprising, for each dataset model that includes a command that comprises the first parameter, re-executing the command in the corresponding dataset model on the data in valid instances of the one or more parent datasets of the dataset model.

6. The method of claim 1, wherein the first dataset model comprises a defined metric, wherein the definition of the metric comprises first dataset model metadata.

7. The method of claim 6,
wherein the first analytical result comprises a first metric value resulting from application of the metric to data in the first instance of the first dataset model, and
wherein the second analytical result comprises a second metric value resulting from application of the metric to data in the second instance of the first dataset model.

8. The method of claim 6, wherein the first dataset model metadata comprises one or more dataset fields.

9. The method of claim 6, wherein the first dataset model metadata comprises a type or description of data relating to a thing.

10. The method of claim 6, further comprising:
storing in a first cache a plurality of metric values resulting from application of the metric to data in the first instance of the first dataset model;
invalidating the first cache when the first instance of the first dataset model is invalidated; and
storing in a second cache a plurality of metric values resulting from application of the metric to data in the second instance of the dataset model.

11. The method of claim 6, further comprising:
storing in a first cache a plurality of metric values resulting from application of the metric to data in the first instance of the first dataset model;
defining a new metric by changing the definition of the metric;
invalidating the first cache; and
storing in a second cache a plurality of metric values resulting from application of the new metric to data in the first instance of the first dataset model.

12. The method of claim 1, wherein data comprised in the primordial dataset is changed by a first process comprising execution, by the processor, of computer instructions in the memory media, and the first process identifies one or more dataset instances that directly or indirectly descend from the primordial dataset as invalid.

13. The method of claim 1, wherein the hierarchy of dataset models comprises an intermediate dataset model, wherein the intermediate dataset model descends directly or indirectly from the primordial dataset, wherein the first dataset model descends directly or indirectly from the intermediate dataset model, and wherein the data in instances of the intermediate dataset model is not displayed.

14. The method of claim 13, further comprising invalidating an instance of the intermediate dataset model in response to a change in data comprised in the primordial dataset and re-executing a command associated with the intermediate dataset model to create a valid instance of the intermediate dataset model.

15. The method of claim 1, wherein a change in data comprised in the primordial dataset comprises the addition of data that already exists to the primordial dataset.

16. The method of claim 15, wherein the addition of data that already exists to the primordial dataset does not disrupt current use of existing data or invalidate existing analytic processes.

17. The method of claim 1, wherein the second analytical result automatically reflects the most current data in the primordial dataset.

18. A system for displaying current analytical results, comprising:
a computer system comprising at least one processor and a memory media;
persistent storage coupled to the computer system comprising a data store comprising a primordial dataset which has no parents and a hierarchy of dataset models, including a first dataset model, each dataset model comprising a command, a data description, and one or more parent datasets, wherein at least one dataset model has a parent dataset that is the primordial dataset, and wherein the first dataset model directly or indirectly descends from the primordial dataset;

a display interface coupled to the computer system, the display interface adapted and configured to display an analytical result based on the first dataset model; and
instructions which when loaded into the memory media and executed by the processor cause the computer system to perform:
creating a first instance of the first dataset model by executing the command in the first dataset model on the data in valid instances of the one or more parent datasets of the first dataset model, wherein creating an instance of a dataset model comprises executing the command of the dataset model on the data in valid instances of the one or more parent datasets of the dataset model and storing in the data store the data produced by said executing the command;
displaying a first analytical result based on the first instance of the first dataset model;
when there is a change in data comprised in the primordial dataset, and in response to said change in data comprised in the primordial dataset, invalidating each instance of a dataset model that directly or indirectly descends from the primordial dataset, including invalidating the first instance of the first dataset model, wherein invalidating an instance of a dataset model comprises identifying the instance of the dataset model as invalid;
re-executing, for each invalid instance of a dataset model, the command in the corresponding dataset model on the data in the re-executed instances of the one or more parent datasets of the dataset model, including re-executing the command in the first dataset model on the data in the re-executed instances of the one or more parent datasets of the first dataset model to create a second instance of the first dataset model, and
displaying a second analytical result based on the data comprised in the second instance of the first dataset model.

19. The system of claim 18 further comprising instructions which when loaded into the memory media and executed by the processor cause the computer system to perform reproducing the first analytical result after the first instance of the first dataset model has been invalidated.

20. The system of claim 18, wherein the hierarchy of dataset models includes a second dataset model and the command in the second dataset model comprises a first parameter, and wherein creating an instance of the second dataset model comprises using a first value of the first parameter in executing the command in the second dataset model, and further comprising instructions which when loaded into the memory media and executed by the processor cause the computer system to perform:
creating a new instance of the second dataset model using a second value of the first parameter in executing the command in the second dataset model;
for each dataset model that descends directly or indirectly from the second dataset model, re-executing the command in the corresponding dataset model on the data in valid instances of the one or more parent datasets of the dataset model, including creating a third instance of the first dataset model; and
displaying a third analytical result based on the data comprised in the third instance of the first dataset model, which third analytical result shows the analytical results of changing the first parameter value.

21. The system of claim 18, wherein the first dataset model comprises a defined metric, wherein the definition of the metric comprises first dataset model metadata.

22. The system of claim 21,
wherein the first analytical result comprises a first metric value resulting from application of the metric to data in the first instance of the first dataset model, and
wherein the second analytical result comprises a second metric value resulting from application of the metric to data in the second instance of the first dataset model.

23. The system of claim 21, wherein the first dataset model metadata comprises one or more dataset fields.

24. The system of claim 21, wherein the first dataset model metadata comprises a type or description of data relating to a thing.

25. The system of claim 21, further comprising instructions which when loaded into the memory media and executed by the processor cause the computer system to perform:
storing in a first cache a plurality of metric values resulting from application of the metric to data in the first instance of the first dataset model;
invalidating the first cache when the first instance of the first dataset model is invalidated; and
storing in a second cache a plurality of metric values resulting from application of the metric to data in the second instance of the dataset model.

26. The system of claim 21, further comprising instructions which when loaded into the memory media and executed by the processor cause the computer system to perform:
storing in a first cache a plurality of metric values resulting from application of the metric to data in the first instance of the first dataset model;
defining a new metric by changing the definition of the metric;
invalidating the first cache; and
storing in a second cache a plurality of metric values resulting from application of the new metric to data in the first instance of the first dataset model.

27. In a method of analysis comprising executing one or more ordered sequences of analytics on a hierarchy of data sets comprising a primordial dataset, a method of propagating data changes in the primordial dataset comprising:
representing one or more ordered sequences of analytics in a hierarchy of dataset models, wherein each of the dataset models comprises a command and a data description, each dataset model has at least one parent, and each dataset model descends directly or indirectly from a first primordial dataset which has no parents, wherein the first primordial dataset and the hierarchy of dataset models are comprised in a data store comprised in persistent media coupled to a computer system comprising a processor and a memory media;
instantiating a dataset instance of each dataset model in the hierarchy of dataset models, wherein each dataset instance comprises data and hierarchy metadata, and wherein instantiating an instance of a dataset model comprises executing the command associated with the dataset model on the data comprised in valid instances of the parents of the dataset model and storing in the data store the data produced by said executing the command, wherein executing the command comprises execution, by the processor, of computer instructions in the memory media;
when there is a data change in the first primordial dataset, and in response to said data change in the first primordial dataset, invalidating each instance of a dataset model that descends directly or indirectly from the first primordial dataset, wherein invalidating an instance of a dataset model comprises identifying the instance of the dataset model as invalid; and for each dataset model that descends directly or indirectly from the first primordial dataset, instantiating a new instance of the dataset model by executing the command associated with the dataset model on the data comprised in valid instances of the parents of the dataset model.

28. The method of claim 27 further comprising deriving an analytical result based on a valid instance of a dataset model.

29. The method of claim 27 further comprising reproducing a previously-derived analytical result.

30. The method of claim 29 further comprising reproducing a previously-derived analytical result based on an invalidated instance of a dataset model.

31. The method of claim 27, wherein the hierarchy of dataset models includes a first dataset model wherein the command in the first dataset model comprises a first parameter, wherein instantiating a dataset instance of each dataset model in the hierarchy of dataset models further comprises creating an instance of the first dataset model using a first value of the first parameter in executing the command in the first dataset model, and further comprising:

instantiating a new dataset instance of the first dataset model by executing the command in the first dataset model with a second parameter value; and for each dataset model that descends directly or indirectly from the first dataset model, instantiating a new instance of the dataset model by executing the command associated with the dataset model on the data comprised in valid instances of the parents of the dataset model.

32. A system for executing one or more ordered sequences of analytics on a primordial dataset and propagating data changes in the primordial dataset comprising:

a computer system comprising at least one processor and a memory media;

persistent storage coupled to the computer system comprising a data store comprising a first primordial dataset which has no parents and a hierarchy of dataset models;

instructions which when loaded into the memory media and executed by the processor cause the computer system to perform:

representing one or more ordered sequences of analytics in the hierarchy of dataset models, wherein each of the dataset models comprises a command and a data description, each dataset model has at least one parent, and each dataset model descends directly or indirectly from the first primordial dataset;

instantiating a dataset instance of each dataset model in the hierarchy of dataset models, wherein each dataset instance comprises data and hierarchy metadata, and wherein instantiating an instance of a dataset model comprises executing the command associated with the dataset model on the data comprised in valid instances of the parents of the dataset model and storing the instance in the data store;

when there is a data change in the first primordial dataset, and in response to said data change in the first primordial dataset, invalidating each instance of a dataset model that descends directly or indirectly from the first primordial dataset, wherein invalidating an instance of a dataset model comprises identifying the instance of the dataset model as invalid; and for each dataset model that descends directly or indirectly from the first primordial dataset, instantiating a new instance of the dataset model by executing the command associated with the dataset model on the data comprised in valid instances of the parents of the dataset model.

33. The system of claim 32, further comprising instructions which when loaded into the memory media and executed by the processor cause the computer system to perform deriving an analytical result based on a valid instance of a dataset model.

34. The system of claim 32, further comprising instructions which when loaded into the memory media and executed by the processor cause the computer system to perform reproducing a previously-derived analytical result.

35. The system of claim 34, further comprising instructions which when loaded into the memory media and executed by the processor cause the computer system to perform reproducing a previously-derived analytical result based on an invalidated instance of a dataset model.

* * * * *